US012344473B1

(12) United States Patent
Theobald

(10) Patent No.: US 12,344,473 B1
(45) Date of Patent: Jul. 1, 2025

(54) SYSTEM AND METHOD OF PROVIDING DELIVERY OF ITEMS FROM ONE CONTAINER TO ANOTHER CONTAINER FOR A USER IN AN ERGONOMIC MANNER

(71) Applicant: Vecna Technologies, Inc., Cambridge, MA (US)

(72) Inventor: Daniel Theobald, Somerville, MA (US)

(73) Assignee: VECNA ROBOTICS, INC., Waltham, MA (US)

( * ) Notice: Subject to any disclaimer, the term of this patent is extended or adjusted under 35 U.S.C. 154(b) by 232 days.

(21) Appl. No.: 18/146,760

(22) Filed: Dec. 27, 2022

Related U.S. Application Data

(63) Continuation of application No. 16/035,323, filed on Jul. 13, 2018, now abandoned.

(51) Int. Cl.
*B65G 1/06* (2006.01)
*B25J 5/00* (2006.01)
*B25J 9/16* (2006.01)
*B65G 1/04* (2006.01)
*G05D 1/00* (2006.01)

(52) U.S. Cl.
CPC .............. *B65G 1/065* (2013.01); *B25J 5/007* (2013.01); *B25J 9/161* (2013.01); *B25J 9/1689* (2013.01); *B65G 1/0492* (2013.01); *G05D 1/0212* (2013.01); *G05D 1/0276* (2013.01)

(58) Field of Classification Search
CPC ..................................................... B65G 1/065
See application file for complete search history.

(56) References Cited

U.S. PATENT DOCUMENTS

| | | | |
|---|---|---|---|
| 7,363,104 B2 | 4/2008 | Stevens |
| 8,104,601 B2 | 1/2012 | Hayduchok |
| 8,335,585 B2 | 12/2012 | Hansl |
| 9,481,518 B2 | 11/2016 | Neiser |
| 9,604,781 B2 | 3/2017 | Stevens |
| 2015/0114799 A1 | 4/2015 | Hansl |
| 2018/0165938 A1 | 6/2018 | Honda |
| 2018/0244473 A1 | 8/2018 | Mathi |
| 2018/0265298 A1 | 9/2018 | Wagner |
| 2019/0127147 A1 | 5/2019 | Wagner |

*Primary Examiner* — Jonathan Snelting

(57) ABSTRACT

A method is disclosed for enabling a user to move items from one container to another. The method includes identifying a location of a user who will transfer items from a first container, attached to a first robot, to a second container, attached to a second robot, positioning the first container at a first position near the location of the user and positioning the second container via movement of the second robot at a second position near the location of the user. The method includes providing instructions to the user regarding how many items to move from the first container to the second container, receiving at least one item in the second container from the user and moving the second container from the second position to a destination position for the at least one item.

21 Claims, 14 Drawing Sheets

SYSTEM AND METHOD OF PROVIDING DELIVERY OF ITEMS FROM ONE CONTAINER TO ANOTHER CONTAINER FOR A USER IN AN ERGONOMIC MANNER

The present technology pertains to robotics and more specifically to a system and method of providing and controlling robots in a warehouse environment to improve distribution of items through the warehouse and from one container to another, wherein robots are moved and positioned for a user to move items from one container to another in an ergonomic fashion.

BACKGROUND

The present disclosure relates to robotic systems for use in a warehouse or other environment. In many warehouse environments or supply chain environments, items have to be moved from one bin or container to another. The movement of items can be achieved through manual processes involving humans and/or the use of robots. A basic aspect of moving items involves picking as many objects from a source bin for distribution to multiple destination bins. Where humans are involved, much time is wasted when humans must locate and verify the right bins for transferring objects from bin to bin. Once the proper set of bins is identified, the human user wants to perform as many "picks" from the same source bin as possible.

Robotic warehouse systems have been developed to help manage this process in a way that is as automated as possible. Automated warehouses have some benefits over warehouses that use humans in some aspects of the process. However, a challenge that exists with respect to automated robotic systems is that they are designed for complete automation. In a completely automated robotic distribution system, typically the maximum amount of throughput is essentially fixed. Thus, if the system is designed to provide a maximum of movement of, say, 1000 items through the warehouse, it can become very difficult to scale up to higher amounts of throughput.

Accordingly, even with increased automation in warehouse environments, additional efficiencies and scalability issues still exist.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
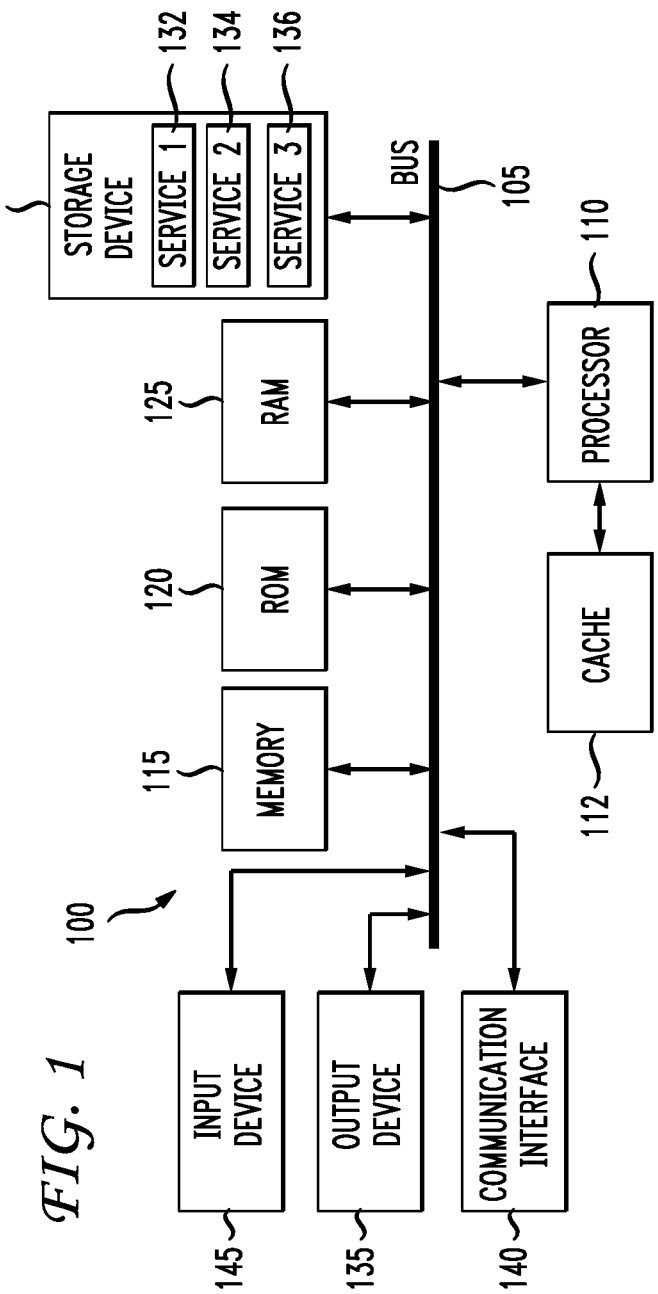
FIG. 1 illustrates an example computing device for use an any component disclosed herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms.

The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The concepts disclosed herein can apply to any supply chain management and include any context or environment in which, generally speaking, items need to be moved from one container to another container. The present disclosure can address the issue raised above with respect to the waste of time that often occurs where a human picker must locate and verify one or more of the right source bin and/or the right destination bin(s) for items to be moved from one bin to another. A number of different solutions disclosed herein address this issue and improve the process for human pickers through the application of various new technologies.

One example environment that shall be referenced herein as a warehouse environment and what shall be presented are numerous improvements with respect to how items can be transferred from one container to another container either in an automated fashion or a hybrid of automated and manual means. While not every concept includes a manual or a human involved in the process, at least one of the embodiments disclosed herein can address the issue of scalability, such that a hybrid environments can be created, which includes a robotic component for increased efficiencies where that is possible, but also includes a human component which enables the overall environment to adjust to incorporate a human element which enables increased scalability at times of higher throughput needs.

The term warehouse as used herein is generally meant to include any building or facility used to store items which may need to be transferred from a source location, such as the building or facility or a source container within the building or facility, to a destination location, such as a destination building or facility or a destination container within one or more buildings or facilities (e.g., the source building or facility). Of course, the environment does not formally have to be a warehouse, but this term is merely used to describe generally the building or facility and the environment in which the robots and/or human workers operate.

Overview

This disclosure provides various different solutions (e.g., examples, configurations, implementations, procedures, etc.) that address the issues outlined above in different aspects. A first aspect of this disclosure relates to robot pre-staging items/totes for optimal picking, so humans can pick the items/totes with high efficiency. This can be referred to as asynchronous collaboration. The general idea is to provide a hybrid environment in which robots can pre-stage items/totes in a particular order. For example, items in containers on shelves in a warehouse can be pre-staged in a particular order, such that a user can step through the transition of items from one container to another in an efficient manner according to the particular order. A container delivery robot can deliver the plurality of containers to one or more shelves in a shelf rack system. Smaller, shorter robots can also be configured to support a respective recipient container on top of the smaller, shorter robots. The shorter robots can position a respective recipient container underneath the first shelf and on the floor level. Thus, in an automated fashion, containers can be positioned in particular positions on shelves and on mobile robots on a floor level and below the shelves.

With the pre-staging of containers each having one or more items, the user can efficiently move from left to right or right to left and have instructions provided on retrieving items from a first container on a shelf, and delivering the items to a respective recipient container on the smaller robot on the floor level. To further make the transition easier, the system can coordinate the movement of the recipient containers on their respective robots such that they extend out into the aisle so a user can easily see and drop one or more items into each recipient container. Each robot in the system can communicate wirelessly with a central control system which can manage the timing of events/operations, the instructions provided for robot movements, and the instructions to the user. The user can utilize a virtual reality headset, an augmented reality headset, a handheld scanner, an audio system or video system, or any other mechanism to receive instructions on what items to retrieve for which containers and in which containers to deliver the items to. Confirmation mechanisms can be built into the shelving system. For example, a user could simply begin to reach and retrieve items at a first container, and a motion detection mechanism can detect motion from the user and trigger the system to inform the user to grab a number of items (e.g., three) from the source container and deliver one or more items into each of one or more recipient containers (e.g., three different recipient containers) that are extended via the short robots into the aisle for easy access.

The system and method of enabling a transfer of products from one container to another container can involve robots presenting or identifying both or either of the source tote and the destination tote (e.g., coming out a little bit from under shelf) to case identification of what to pick from and where to deliver to (potentially with audio to indicate quantities).

In another aspect, it is assumed that containers on a shelf are properly positioned and that robots on the floor with containers are properly positioned as well. The system and method here can involve receiving an identification from a user of a source container on the shelf. The identification can indicate that one or more items in the source container will be moved from the source container to a destination container on a first robot at a first position on a floor under the shelf, wherein a second robot is also positioned on the floor under the shelf. Based on the identification, a system (1) causes the first robot to move at least partially from the first position on the floor under the shelf to a second position which causes the destination container to be accessible to the user, (2) receives a confirmation that the user has transferred a product from the source container to the destination container on the robot and, (3) based on the confirmation, moves the robot from the second position to a third position under the shelf. The first position and the third position can be approximately the same position. A first bar code scan of a bar code on the source container can be used to receive the first identification and a second bar code scan can be used to receive the confirmation. Other mechanisms can also be implemented for providing confirmation of the transfer of items from one container to another. For example, a first motion detector can be used to receive the identification, and a second motion detector can be used to receive the confirmation. The steps can be iteratively applied, such that multiple items from different containers can be moved from the respective source container on a shelf to a respective recipient container positioned on a robot on the floor. In another aspect, an indication can be given to the user to retrieve an item from a particular container and deposit the item in a particular destination container.

In yet another aspect, motion detection can be utilized to trigger operations based on user movements. For example, when a user reaches into a first source container, a motion detection mechanism can trigger the control system to identify which source container is being accessed, at which point the instruction can be provided to the user and to one or more robots on the floor to indicate how many items the user should retrieve from the source container and how many items to place into each of one or more robots which move into a new position on the floor to retrieve one or more items. Thus, in this regard, the user may not be confined to accessing the source containers in any particular order or according to any particular instruction. If there are multiple shelves, each containing source containers, the user can simply start and access the containers on any shelf and receive dynamic and relative instructions with respect to how many items to retrieve from each container and where to deliver those items based on which robots move from underneath the shelf and at least partially into an aisle for retrieving the items.

Another aspect involves utilizing a suction cup robot having only 2 degrees of freedom and which is positioned to interact with multiple robots, each of which has a container configured thereon, such that multiple robots will move into position and the suction cup robot will retrieve items from a source container and deliver them to a destination container. A method in this regard includes positioning a source container under a suction robot having two degrees of freedom only, the suction robot having a flexible suction end having a variable suction component that can cause suction to occur within the suction end upon contact with an item in the source container, wherein the contact can be non-orthogonal of an end of the flexible suction and a surface of the product, retrieving the item from the source container with the flexible suction end by lowering the flexible suction end into the source container to retrieve the item to yield a retrieved item, lifting the retrieved item from the source container from a lower position to a higher position and moving the retrieved item horizontally from the source container to a destination container, wherein the source container is associated with a source robot and the destination container is associated with a destination robot.

The source robot can be moved into a position under the flexible suction end as directed by a control entity. The destination robot can be moved into a second position near the first position such that the suction robot can transfer the retrieved item to the destination container. The method can further include providing, via a control entity, a number of items to be moved from the source container to the destination container. The method can also include moving a first retrieved item from the source container to a first destination container and moving a second retrieved item from the source container to a second destination container, wherein the second destination container is in a different position than the first destination container.

In one aspect, the flexible suction end includes a central open portion having a camera that is positioned to view the item from a viewpoint of the flexible suction end. In this regard, the method can include retrieving the item from the source container with the flexible suction end by lowering the flexible suction and into the source container utilizing feedback at a control entity from the camera that is positioned to view the item from the viewpoint of the flexible suction end.

Another aspect of this disclosure includes an ergonomic approach to enable a person to transfer items from a source container to a destination container from a sitting or standing position via the control of robots being positioned in an easily-accessible location around the user. For example, the user could be sitting on a chair and multiple elevations of semicircular shelves around the user could be configured such that robots configured with containers can move in and position themselves with an easy arm reach of the user. Virtual reality goggles, augmented reality goggles, audible instructions, haptic instructions, light based instructions, etc., can then instruct the user to transfer one or more items from a source container configured on a robot to one or more destination containers configured on other robots. Once a transfer is complete, the one or more robots can then retreat to other destinations, and other robots can be positioned for additional transfers.

A method in this regard includes identifying a central location of a user who will transfer items from a first container attached to a first robot, to a second container attached to a second robot, positioning, via a control entity in wireless communication with the first robot, the first container via movement of the first robot at a first position near the central location of the user, positioning, via the control entity in wireless communication with the second robot, the second container via movement of the second robot at a second position near the central location of the user, providing, via the control entity, instructions to the user regarding how many items to move from the first container to the second container, receiving at least one item in the second container from the user, and moving the second container from the second position to a destination position for the at least one item.

Yet another aspect disclosed herein involves utilizing a ramp on a floor level in which the ramp is configured below one or more shelves in a rack of shelves. The ramp enables a robot having a container configured thereon to move up the ramp and be positioned under a first shelf such that the container is thereby elevated to a higher elevation than the container would be when the robot is on the floor. The purpose of this elevation is because drawer handler robots which retrieve and deliver drawers or containers from the shelves in the rack of shelves have to have a minimum height for retrieving and delivering drawers/containers that is typically higher than the level of a container configured on a robot when the robot is on the floor. Accordingly, configuring a ramp which can raise the elevation of a robot between 1 inch and 10 inches above the floor level can enable a robot having a configured container thereon to move into a position below a first shelf of a rack of shelves and thereby deliver a container to the drawer delivery robot for movement to another location. A robot configured on the elevation level of the ramp that does not have a container configured thereon can also receive a container from the drawer delivery robot.

The use of this ramp based system can be implemented for the purpose of container pre-staging as discussed above. For example, a drawer delivery robot may only be able to internally store 4 containers for delivery to one or more shelves as a container pre-staging process. If the system can deliver four or five robots to the elevation level of the ramp system, then the drawer delivery robots can deliver four containers to the appropriate shelves in a particular order, and then essentially immediately retrieve four or five more shelves from the four or five robots and deliver those containers to the one or more shelves in the appropriate pre-staging order. Thus, the interaction between the floor based robots that utilize the ramp system and the drawer delivery robot can increase efficiencies in a number of respects, including a container pre-staging process. It is noted again that the container pre-staging process involves a hybrid environment in which the robots work in coordination with the human user. By pre-staging the containers in a particular order, a human can more efficiently transfer individual items from source containers on shelves to recipient containers on robots on a floor level.

It is noted that in the ramp-based configuration, even if the robots are on a ramp elevation level, they still may include a mechanism of moving to retrieve items from the user or the robots could be configured to have an extendable component which enables the robot to remain on an elevation level under the first shelf but extends the container out a sufficient amount to make it easy for the user to place an item in the recipient container. In this example, the robot can move into the aisle such that the user can place the items in the recipient container on the robot.

DETAILED DESCRIPTION

The disclosure now turns to FIG. 1, which illustrates an example computing system including various hardware components, which can be used to implement the system, depot, robot, server, communication device, or any other computing device disclosed herein.

In this example, FIG. 1 illustrates a computing system architecture 100 including components in electrical communication with each other using a connection 105, such as a bus. System 100 includes a processing unit (CPU or processor) 110 and a system connection 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware or software service, such as service 1 132, service 2 134, and service 3 136 stored in storage device 130, configured to control the processor 110 as well as a special-purpose processor where software instructions are incorporated into the actual processor design. The processor 110 may be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include services 132, 134, 136 for controlling the processor 110. Other hardware or software modules are contemplated. The storage device 130 can be connected to the system connection 105. In one aspect, a hardware module that performs a particular function can include the software component stored in a computer-readable medium in connection with the necessary hardware components, such as the processor 110, connection 105, output device 135, and so forth, to carry out the function.

For clarity of explanation, in some instances the present technology may be presented as including individual functional blocks including functional blocks comprising devices, device components, steps or routines in a method embodied in software, or combinations of hardware and software.

The systems and methods disclosed herein address the problem of managing the movement of items through a warehouse or in another supply chain environment. A number of different examples, configurations and methods will be disclosed. It is noted that in overall supply chain management environment, any of the concepts disclosed herein, or any of the steps that are taken, can be combined with any other example, step, or concept. For example, the pre-staging concept can be combined with the suction robot.

Figure 2A:
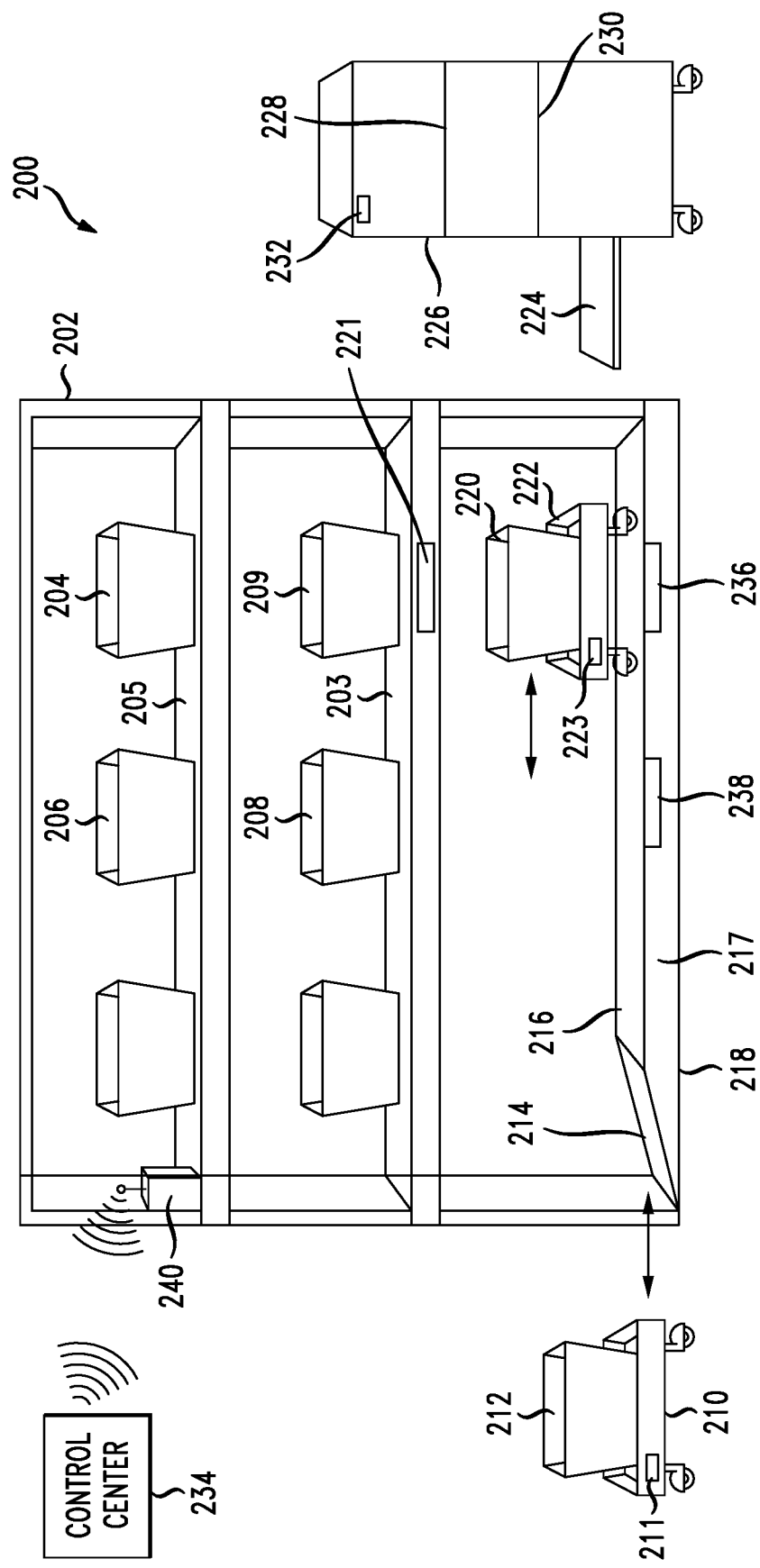
FIG. 2A illustrates an example ramp and shelf environment for communication of drawers from one robot to another robot.

FIG. 2A illustrates several aspects of this disclosure, with a system 200 that includes a rack of shelves 202, including a first shelf 203 and the second shelf 205. The rack 202 will include typically one or more shelves. On the shelves 203, 205 are example totes or containers 204, 206, 208. Generally speaking, these containers (204, 206, 208) include items that need to be moved from one of the containers on the shelves 203, 205 to a recipient container which is typically on the floor 218 or an elevated surface 216. A drawer swapping robot 226 can include drawer swapping mechanism 224 and storage capabilities 228 and 230 for storing drawers therein. Communication unit 232 enables the robot 226 to communicate wirelessly with the control center 234. Any mechanism of wireless communication can be utilized within the system. Wi-Fi, cellular, Bluetooth, near field communication, and even wired communication can be utilized for a control center 234 to control the movement of one or more drawer swapping robots 226. Low profile robots 210, 222 include respective containers 212, 220 configured thereon. These robots (210, 222) have control units 211, 223 which enable them to communicate with the control center 234, one or more drawer swapping robots 226 and other low-profile robots, or any other computing device with wireless capabilities.

A ramp 214 can be used by robots to move up the ramp 214 and on a raised elevation 216. The ramp 214 can raise the robot 222 from a floor level (e.g., 218) so the drawer swapping mechanism 224 can be used to retrieve a container 220 or provide a container to the robot 222. The lowest level possible for the drawer swapping mechanism 224 is typically too high to match or be able to swap a container 220 when the low profile robot 222 is on the floor level 218.

Yet another aspect disclosed herein involves utilizing a ramp on a floor level in which the ramp is configured below one or more shelves in a rack of shelves. The ramp enables a robot having a container configured thereon to move up the ramp and be positioned under a first shelf (e.g., 203) such that the container is thereby elevated to a higher elevation than the container would be when the robot is on the floor (218). The ramp could also enable a robot to elevate to a shelf level. The purpose of moving the robot to an elevated level is because drawer handler robots which retrieve and deliver drawers or containers from the shelves in the rack 202 of shelves have a minimum height for retrieving and delivering drawers/containers that is typically higher than the level of a container configured on a robot when the robot is on the floor. Accordingly, configuring a ramp which can raise the elevation of a robot above the floor level (e.g., between 1 inch and 10 inches or so depending on the particular configuration) can enable a robot having a configured container thereon to move into a position below a first shelf of the rack 202 of shelves and thereby deliver a container to the drawer delivery robot 226 for movement to another location. A robot configured on the elevation level of the ramp that does not have a container configured thereon can also receive a container from the drawer delivery robot 226.

The use of this ramp based system can be implemented for container pre-staging as discussed above. For example, a drawer delivery robot (226) may only be able to internally store 4 containers for delivery to one or more shelves as a container pre-staging process. If the system can deliver four or five robots to the elevation level of the ramp system, then the drawer delivery robots (226) can deliver four containers to the appropriate shelves in a particular order, and then essentially immediately retrieve four or five more containers from the four or five robots and deliver those containers to the one or more shelves in the appropriate pre-staging order. Thus, the interaction between the floor based robots (210, 222) that utilize the ramp system and the drawer delivery robot (226) can increase efficiencies in a number of respects, including a container pre-staging process. It is noted again that the container pre-staging process involves a hybrid environment in which the robots work in coordination with the human user. By pre-staging the containers in a particular order, a human can more efficiently transfer individual items from source containers on shelves to recipient containers on robots on a floor level.

Even if the robots are on a ramp elevation level (216), they still may include a mechanism of moving to retrieve items from the user or the robots could be configured to have an extendable component which enables the robot to remain on an elevation level under the first shelf but extends the container out a sufficient amount to make it easy for the user to place an item in the recipient container. In the example above, the robot simply moves into the aisle such that the user can place the items in the recipient container on the robot.

Any number of mechanisms can be implemented in this context to make a recipient container more accessible for the user. For example, a container wall can be hinged such that the wall nearest to the user can rotate to make an opening more available and accessible to the user, a robot can move, a container can slide out from the robot which does not move to make a container more accessible, and so forth.

In another aspect, the ramp and elevation level could also be retractable. For example, an air system could inflate the ramp structure such that robots could travel up the ramp to the elevation level such that their respective containers can be retrieved by the drawer delivery robot 226. The drawer delivery robot 226 can then deliver empty containers onto the robots at which point the inflated ramp could deflate such that the robots drop down to a floor level 218. Then, when the user comes in to transfer items from source containers to recipient containers on the robots, the robots can simply move out into the aisle to receive items transferred from the users. These and other concepts could be utilized to make the recipient containers more accessible for the users.

A system according to the above description can include a shelf 203 positioned at a shelf level and above a floor level 218, a ramp 214 starting at the floor level and transitioning from a floor level 218 to a first level between the floor level 218 and the shelf level, wherein a robot having a drawer configured on top can travel from the floor level 218 up the ramp 214 to the first level without touching the shelf 203 and a drawer handler robot having a drawer transitioning lower level which is between the floor level 218 and the shelf level. The system can include a processor and a computer-readable medium storing instructions which, when executed by the processor, cause the processor to perform operations. The medium and processor may be in one or more robots (210, 222, 226) and/or a control system 234 communicating with the various robots. The operations include providing a first instruction for the robot (210, 222) to travel up the ramp 214 to the first level, positioning the robot to move up the ramp 214 and to the first level according to the first instruction, providing a second instruction for the drawer handler robot 226 to retrieve the drawer configured on the robot, positioning, based on the second instruction, the drawer handler robot 226 near the robot 222 configured with the drawer and on the first level and retrieving the drawer from the robot 222 on the first level via a drawer handler mechanism 224 configured on the drawer handler robot 226. The operations can also include replacing the drawer configured on the robot with a second drawer provided by the drawer handler robot 226.

Another aspect of the system 200 is a communication unit 240 which can communicate information to and from the control center 234. The information can include data about a status of containers on the shelves (203, 205), low-profile robots (210, 222), and other data. For example, feature 238 and feature 236 represent sensor units that can include gesture or movement sensors, weight sensors, light sensors, voice sensors, and so forth. For example, once robot 222 is in position on the elevated level 217, a sensor (e.g., 236, 238) can receive a confirmation that it is there. The sensor (e.g., 236, 238) can also determine whether an item of certain weight has been placed within the container 220.

With this basic understanding of the configuration of system 200, a concept of container pre-staging shall be discussed next. An aspect of this disclosure involves the hybrid environment in which robots 226, 222, 210 work together with humans to increase the scaling capacity and efficiency of a supply chain environment in which items need to be moved from one container to another to fulfill orders. In one aspect, a pre-staging operation can be utilized to improve the efficiency of the system. For example, a drawer swapping unit 226 can be instructed and provided with various containers that are to be positioned in certain spots within the rack 202. The control center 234 would know what items would be placed in respect of containers and also know the desired flow of items from one container to another such that items from different origination containers could be moved to the appropriate destination containers for distribution and ultimate delivery to customers. A pre-staging operation can utilize the drawer swapping robot 226 to position containers in an efficient manner in the rack system 202. For example, the drawer swapping system would position container 209, container 204, container 206, container 208, and so forth such that a low profile robot 222, as well as other low-profile robots, could be configured on a floor level 218 or on an elevated level 216, such that a human could start at the right hand side of rack 202 and receive instructions via audio, visual, virtual reality, augmented reality, haptic instructions, and so forth, to perform the following example operations.

Having pre-staged source containers on the shelves and recipient containers on the low-profile robots, the user could then start with source container 209 and be told to retrieve three items from that container and place them in the container 220. The user could utilize a barcode scanner to indicate when items have been appropriately retrieved from the source container 209 as well as appropriately delivered to the destination container 220. Other approaches for accurately confirming the retrieval and delivery of items from one container to another shall be discussed in more detail below.

Next, the user could retrieve items from source container 204 deliver the items to a destination container 212 which can be configured or positioned at location either on the floor level 218 or the elevation 216. With respect to the pre-staging process, there are any number of factors that can come into play with respect to how the drawer swapping robot 226 will pre-position containers. For example, having the knowledge of the type of items within respective containers, the drawer swapping robot 226 could be instructed to position containers that have heavier items to transfer on the lowest shelf 203. Lighter items can be placed on the higher shelf 205. Larger items may also be positioned on one shelf or another. The shape of some items might be more difficult for a human to grasp. Accordingly, the shape could also indicate which shelves a container will be positioned on.

In another aspect, containers may themselves have different shapes depending on which shelf they are to be delivered to. For example, it might be more difficult for a human user to reach up to shelf 205 and into a container to retrieve items. Accordingly, a lower profile container may be positioned on a higher shelf to enable user easier access. A transparency of a container may also relate to which shelf is placed on. For example, because it might be more difficult to see what a container might include, a transparent container might be included on a higher shelf and a nontransparent container may be included on lower shelves. A height of the user who is scheduled to manually handle the transfer of items from source containers to destination containers could also be taken into account. For example, if a tall individual is scheduled to handle the transfer of items from source containers to destination containers and if the pre-staging is being prepared for that individual, then the system might pre-stage containers on three shelves, in as much as the taller user can access a higher third shelf. However, if a shorter individual is scheduled to handle the manual transfer of items from one container to another, the system can instruct the drawer swapping robot 226 to only pre-stage on two shelves.

Further, the system could also provide a balance with respect to the stress on the human from a physical perspective. For example, value can be provided to humans where they do not have to perform the exact same motions or movements on every shift. Thus, in some cases, the pre-staging of containers on shelves could be modified from shift to shift for an particular individual so that they have a different physical experience in transferring items from a source container to a destination container. For example, in one shift, heavier items may be positioned on a lower shelf, whereas in a later shift, the heavier items might be moved to a higher shelf. In yet another aspect, the system can take into account the number of items to be moved. For example, one container might include light items which might be appropriate for being pre-staged on a higher shelf. However, there may be a higher number of items to be transferred from the source container to a destination container. Thus, because of the volume, the pre-staging process will cause the source container, say container 209, to be positioned as closely as possible to the destination container 220.

Machine learning or artificial intelligence can be utilized to train a pre-staging algorithm. The various data points with respect to one or more of the parameters described above can be utilized, such that models can be trained to determine how efficiently or quickly, a human individual transfers items from a plurality of source containers to a plurality of destination containers based on various pre-staging models. Thus, the decisions with respect to how to pre-stage containers can be machine learning driven.

In yet another example, the system may pre-stage, the container such that the user moves from left to right, the first manage the transfer of items from containers on shelf 203. Part of the pre-staging process also includes pre-staging the lower profile robots 210, 222. For example, a user may start at container 209 and transfer fifteen items in the container 220 on low-profile robot 222. While the user then moves to container 208 and receives instructions to transfer five items from container 208 to container 212, which then could be positioned below container 208, if container 220 has received all the items necessary for this transfer, low-profile robot 222 can move to its destination location for delivering the items. A new robot may be moved into the same position as robot 222, such that when the user is now processing the items in the containers on shelf 205 from left to right, when the user arrives at container 204 and is instructed to transfer six items from that container into the destination container, by that time a new robot having a new destination container will be positioned underneath container 209 and ready to retrieve the items. In other words, the pre-staging process not only includes the pre-staging of containers on appropriate shelves, but can also include a dynamic pre-staging and staging of recipient containers below the shelves, based on the particular flow of items through the system.

As is noted above, part of the pre-staging process could include low-profile robots positioning themselves on the elevated level 216 to enable the drawer swapping robot 226 to retrieve containers from respective robots and the position them as needed on the shelves. For example, if six containers need to be pre-positioned on the shelves, and the drawer swapping robot 226 can only hold three drawers, then the pre-staging process could include pre-staging three shelves on low-profile robots on the elevation level 216 and including three shelves within storage units 228, 230 on the drawer swapping robot 226. In this regard, the drawer swapping robot 226 only needs to make a single trip to the rack of shelves 202, such that it can deliver its three containers to the appropriate position on the shelves and then it can retrieve the additional three containers from the low-profile robots at the location and position them respectively on the shelves. The low-profile robots could then retreat and proceed to receive empty recipient containers and return with those containers for receiving items for ultimate delivery.

Part of the pre-staging process also takes into account the positioning of the human when transferring items from source containers to destination containers as well as the position of one or more robots. For example, to avoid collisions, the system can instruct the user to start the transfer of items from source containers to destination containers on all shelves starting from right to left as shown in FIG. 2A. As the user moves from right to left, the drawer swapping robot 226 could follow behind the user, and retrieve completed source containers and replace them with new source containers for an additional round of transfers.

As can be appreciated, any of the factors described above in any combination can be utilized as part of the pre-staging algorithm, which can be implemented to cause a container pre-staging operation in preparation for human transfer of items from source container to destination containers. Of course another aspect, a robot could be also implemented to transfer items from one container to another container.

Another aspect of the pre-staging could also include the concept of the ramp structure 216 being inflatable and deflatable. In this scenario, an inflation system which can be represented as feature 217/240 of the rack system, can be utilized to inflate the ramp system such that the low-profile robots are at level 218. For example, feature 240 can represent a control unit that receives instructions to control an inflation or deflation of the ramp system 217. Component 240 could include a compressor with air which can be connected to the ramp 216 to inflate it to its expanded position. Assume, for example, that the low-profile robots have been utilized to deliver containers to the drawer swapping robot 226 and that they have now received in exchange destination containers for the user to provide items therein. At this point, there is no longer need for the robots to be at an elevated position. The ramp system 217 could then be deflated such that the robots are now at floor level 218 and ready to receive items into their destination containers. Any one or more of the factors or parameters described above can be utilized to determine the movement of the drawer swapping robot 226, the movement of one or more low-profile robots 210, 222, whether a respective robot is positioned on the ramp system 217, whether the ramp system is inflated or deflated, and of course where and in what position in the respective container is placed. With all of the data with respect to the pre-staging of source containers in destination containers, the control center 234 will then provide instructions to a human user with respect to how to transfer items from source containers to destination containers, in an efficient manner. Feature 221 can represent a gesture recognition system, a movement recognition system, a light, a scale, or any other component that can aid in a human picker or robot being able to move items from one container to another or to position a respective container on a shelf.

In this manner, in a hybrid environment, the system can easily and efficiently scale up such that the greater throughput can be available relative to a completely automated arrangement.

Figure 2B:
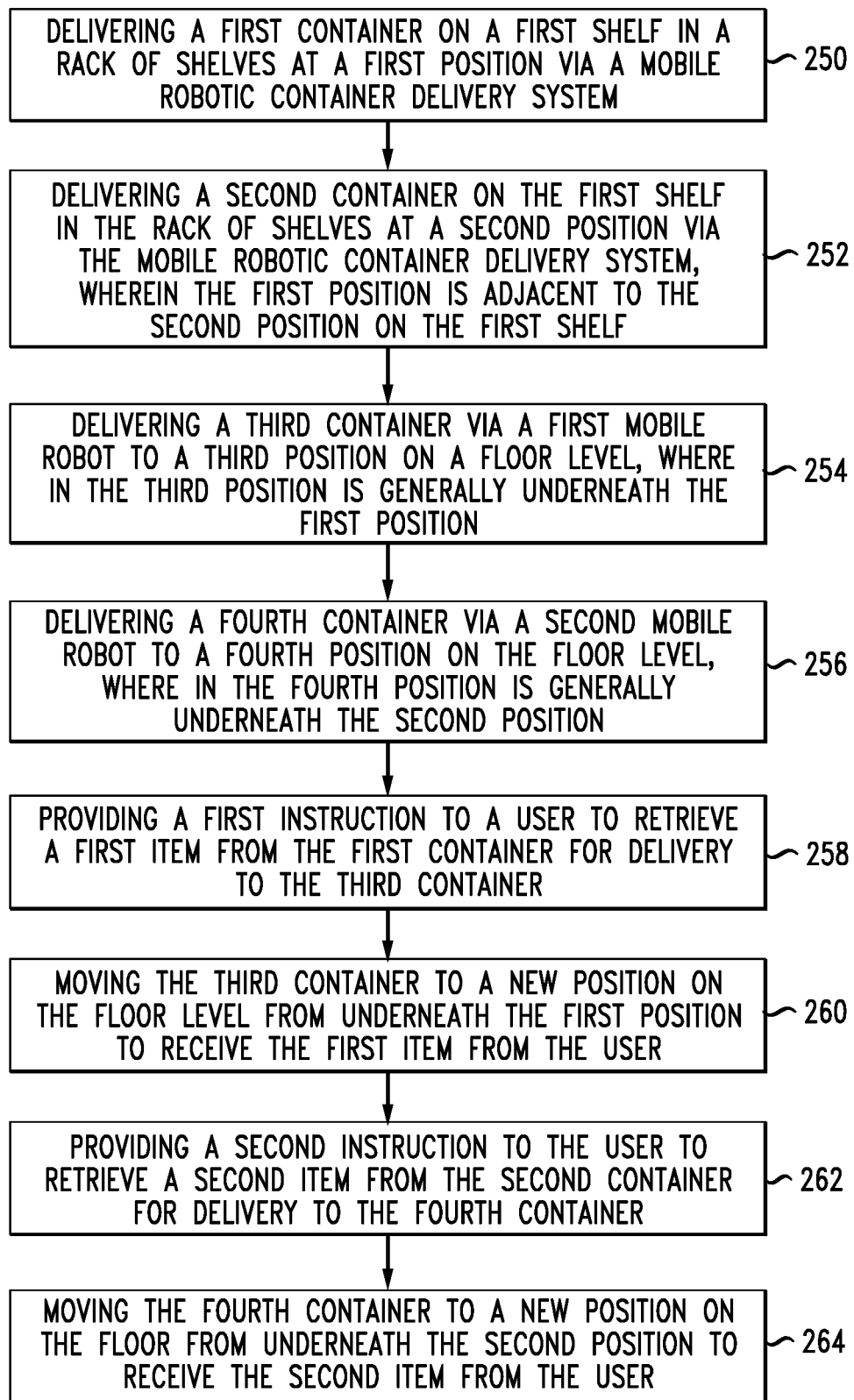
FIG. 2B illustrates an example method for utilizing the ramp and shelf environment.

FIG. 2B illustrates an example pre-staging method. The method can be implemented via a combination of a drawer swapping robot 226, a rack system 202, one or more low-profile robots 210, 222, a control center 234, communication units 232, 236, 238 and 211, a mechanism for providing instruction to the individual user such as an audible unit, a virtual reality unit, augmented reality unit, a haptic unit, and a mechanism for confirming a retrieval of items from a source container and confirming a delivery of items to a destination container and/or other components as well.

An example method includes delivering a first container on a first shelf in a rack of shelves at a first position via a mobile robotic container delivery system (250), delivering a second container on the first shelf in the rack of shelves at a second position via the mobile robotic container delivery system, wherein the first position is adjacent to the second position on the first shelf (252), delivering a third container via a first mobile robot to a third position on a floor level, where in the third position is generally underneath the first position (254), delivering a fourth container via a second mobile robot to a fourth position on the floor level, wherein the fourth position is generally underneath the second position (256), providing a first instruction to a user to retrieve a first item from the first container for delivery to the third container (258), moving the third container to a new position on the floor level from underneath the first position to receive the first item from the user (260), providing a second instruction to the user to retrieve a second item from the second container for delivery to the fourth container (262) and moving the fourth container to a new position on the floor from underneath the second position to receive the second item from the user (264).

The method can also include receiving a first confirmation that the user has retrieved the first item from the first container and delivered the first item to the third container and receiving a second confirmation that the user has retrieved the second item from the second container and deliver the second item to the fourth container. The first confirmation and the second confirmation can be received via one or more of a barcode scan, a motion detection indication, a voice or audible indication, a tactile indication, a weight scale indication, a light-source based indication, or any other sensor or communication signal.

In another aspect, the method can further include delivering a fifth container and a sixth container to the first shelf such that the first container, the second container, the third container, and the fourth container are positioned in an order that corresponds to a positioning of the third container under the first container, and the fourth container under the second container, and a seventh container under the fifth container and an eight container under the sixth container, wherein the user can receive instructions to retrieve items from the first container, the second container, the fifth container, and the sixth container, in order. The instructions can identify destination containers for the items retrieved by the user from the first container, the second container, the fifth container, and the sixth container. For example, the instructions can indicate that the items retrieved from the first container, the second container, the fifth container, and the sixth container should be deposited in the third container, the fourth container, the seventh container, and/or the eighth container. The user can then deposited the retrieved items accordingly based on the instructions.

In another aspect, providing the first instruction and providing the second instruction can occur via one or more of an audible instruction, a virtual/augmented reality instruction, a haptic instruction, a light-based instruction, a video-based instruction, etc. For example, the first and/or second instructions can be provided as an audio instruction outputted via a speaker device, a graphical instruction presented on a display device, haptic instructions, virtual reality instructions, augmented reality instructions, etc. In some cases, the first confirmation and the second confirmation can be received via a motion detection sensor configured on the floor level and/or the first shelf.

The mobile robotic container delivery system can further deliver a plurality of containers between the first shelf and a second shelf. The plurality of containers can be positioned in a manner such that the user can retrieve items from the plurality of containers distributed amongst the first shelf in the second shelf in order of each respective position of the plurality of containers.

Figure 2C:
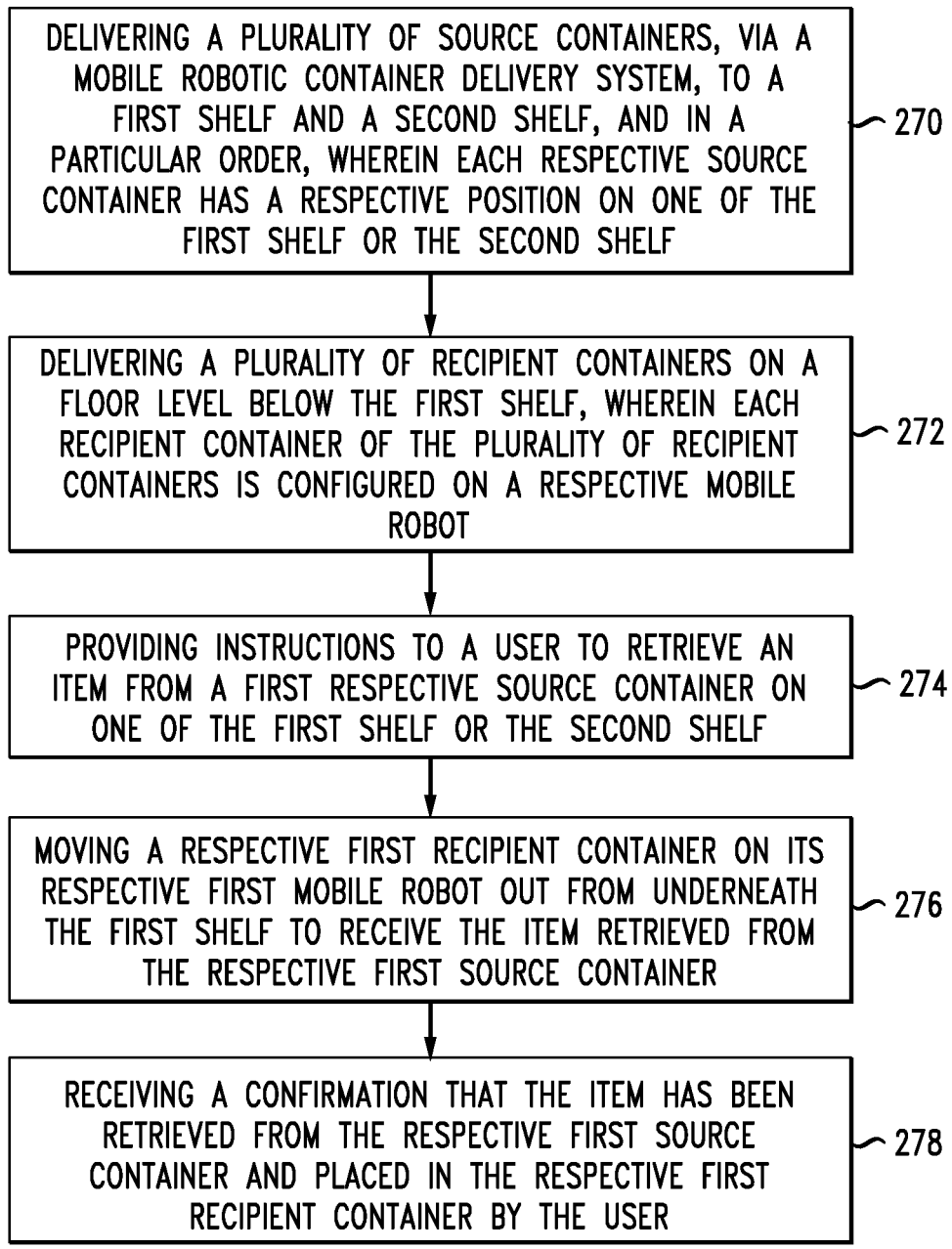
FIG. 2C illustrates another example method embodiment.

FIG. 2C illustrates another method embodiment. The method includes delivering a plurality of source containers, via a mobile robotic container delivery system, to a first shelf and a second shelf, and in a particular order, wherein each respective source container has a respective position on one of the first shelf or the second shelf (270), and delivering a plurality of recipient containers on a floor level below the first shelf, wherein each recipient container of the plurality of recipient containers is configured on a respective mobile robot (272).

The method further includes providing instructions to a user to retrieve an item from a first respective source container on one of the first shelf or the second shelf (274), moving a respective first recipient container on its respective first mobile robot out from underneath the first shelf to receive the item retrieved from the respective first source container (276) and receiving a confirmation that the item has been retrieved from the respective first source container and placed in the respective first recipient container by the user (278).

In some configurations, the confirmation can be received at a control center 234 by virtue of a scanning device that the user uses to scan a bar code on each source container and recipient container. In other configurations, the confirmation can be received at the control center 234 via a signal from a sensor or device that has determined that the item has been retrieved and deposited as instructed. For example, a motion sensing system 238, 236 can be employed such that data can be communicated via a communication unit 240 either wired or wirelessly to a control center 234 that can provide confirmation of the transfer of items from a source container to a destination container. Any mechanism of confirmation can be provided, including such features as visual confirmation, a weight scale identification, which can include scales below each container that can confirm whether a container is lighter because one item was retrieved therefrom or whether a container has received an item based on the additional weight within the container. In this regard, the system can include a scale on respective shelves and on robots such that a weight of each item within a source container or a weight of an item expected to be placed within the destination container could be determined in advance, such that the system knows when items are retrieved or delivered to containers.

Furthermore, an approach that uses scales for determining the weight of items can also capture errors. For example, if a user is supposed to retrieve two items from container 209 and placed them in container 220, and the weight of each item is known (or estimated) by the system 234, if the user only retrieves a single item from container 209, the system can remind the user to retrieve two items. Motion detection algorithms can also be utilized to potentially determine whether the user is carrying two items or retrieves one item at a time.

The method can further include providing instructions to the user to retrieve a second item from a second respective source container on one of the first shelf or the second shelf, moving a respective second recipient container on its respective second mobile robot out from underneath the first shelf to receive the second item retrieved from the respective second source container and receiving a confirmation that the second item has been retrieved from the respective second source container and placed in the respective second recipient container by the user.

Figure 2D:
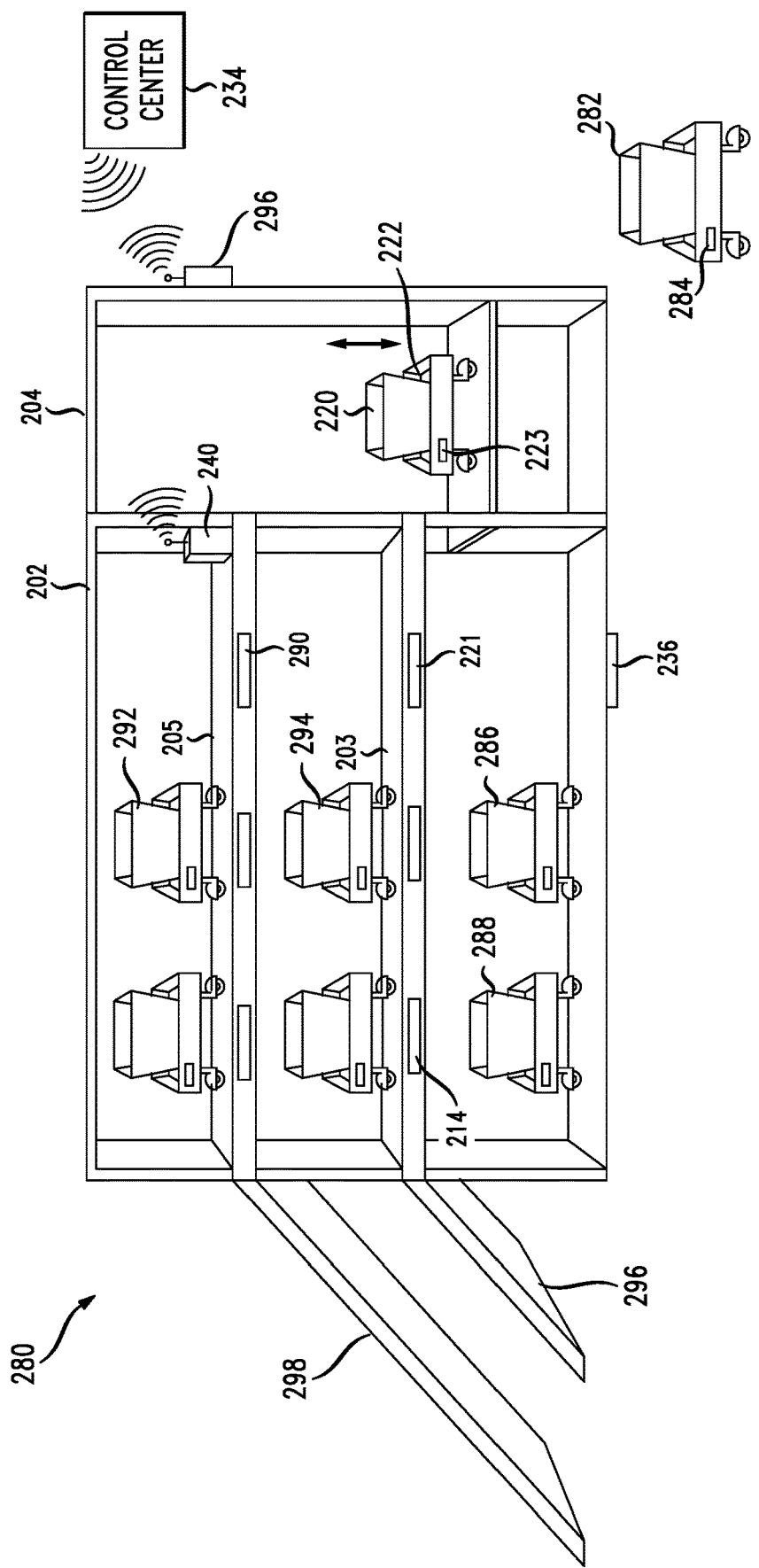
FIG. 2D illustrates an elevator embodiment.

FIG. 2D illustrates another aspect of this disclosure. In a system 280, a rack of shelves 202 includes an elevator system 204. The elevator system 204 is utilized to elevate mobile robots onto respective shelves 203/205. The elevator system 204 can include the basic components of any elevator system, such as an elevator floor, an elevator car (which can include the elevator floor), a motor system, cabling, a control system, a supporting framework, attachment mechanisms to connect an elevator car to a supporting framework to enable the elevator car to go up and down, control mechanisms, and so forth which can be utilized to elevate the elevator floor from a floor level to a respective shelf level. Various mechanical components associated with the elevator system, known to those of skill the art, can be utilized to implement the elevator system.

The elevator system 204 can have a number of different structures or components. For example, the profile of the elevator system may be essentially just large enough to receive a mobile robot 220/222. The mobile robot can move on to an elevator floor and be raised to the assigned shelf. The elevator floor can be part of an elevator car that is movably attached to an elevator system framework. The mobile robot can include a communication mechanism 223 which can communicate with a communication module 296 on the elevator system 204 to identify the destination level. The elevator system 204 that will raise the mobile robot can be autonomous in that the mobile robot may contain and provide the instruction to the elevator system 204 through a wireless communication module. The communication module 223 on the mobile robot can wirelessly communicate with the communication module 296 on the elevator system 204 to provide such instructions. The elevator system 204 can be considered a robot as well.

The elevator system 204 can be constructed such that there are no doors. This can enable a mobile robot 282 to easily roll onto the elevator floor. In one aspect, the elevator system 204 can be constructed such that the mobile robot 282 can enter from any direction that is available. For example, in FIG. 2D, a mobile robot could move on to the elevator floor from the floor level of the shelf system 202, such that mobile robot 286 could simply move to the right and onto the elevator floor. The elevator system 204 could also be configured such that mobile robot 286, which is clearly not already positioned within the shelf system 202, could enter the elevator system from any of the other three directions. For example, the mobile robot 282 could enter from the front of the elevator system 204, or from the right side or from the back side of the elevator system 204.

The communication protocol which is used to communicate signals between the elevator system 204 and the mobile robot can include any known protocol such as Bluetooth, Wi-Fi, Ultra-Wide Band protocols, IR, near field communication, and so forth. As in other embodiments, modules 290/221/236 can be implemented in the shelf system 202 to enable a human picker or an automated robotic picker to move items from one bin to another once the various bins are positioned on the shelves. Mobile robots 292/294/286/288 represent robots that have been moved into their proper position, either on the floor or on an elevated shelf 203, 205 raised up by the elevator system 204. Mobile robot 286, with its communication module 284, represents a next mobile robot that will roll onto the elevator floor after mobile robot 220/222 has arrived at its shelf.

In another aspect, a control center 234 can coordinate the operations of the elevator system 204 through its communication module with the elevator communication module 296. In this respect, the control center 234 can monitor the movement of mobile robots such that as a mobile robot moves on to the elevator floor, the control center 234 will provide instructions regarding which shelf to elevate the mobile robot to system mobile robot can then move from the elevator floor to the respective shelves 203, 205. The control center 234 can also coordinate multiple robots accessing the elevator system 204 to be positioned on respective shelves such that the movement of each respective mobile robot can be coordinated for efficient use of the elevator system, particularly when the elevator system 204 only moves a single robot at a time.

In one embodiment, the size of the elevator floor or the footprint of the elevator system 204 is configured to be just large enough to receive a mobile robot. In another embodiment, the elevator system 204 could be larger, such that multiple mobile robots can be simultaneously elevated.

Communication regarding the movement of mobile robots, their contents, whether they include bins that include items for distribution to other bins, data about human pictures that will be used, to move items from one bin to another, data about automated pickers, or any other data related to the movements of items throughout a warehouse can be communicated between individual respective mobile robots, a control module 240 on a shelf system 202, the communication module 296 associated with an elevator system 204, a control center 234, and/or any other components utilized in the system. All such transmissions, requests for data, confirmations, instructions, updated instructions, and any similar communications are included as within the scope of this disclosure, whether in a system embodiment or in a method embodiment that can be claimed.

In another aspect, FIG. 2D could also include separate ramps to each level. For example, on the left of the shelf system 202, a ramp 296 could be provided from a floor level to the first shelf 203 in another ramp 298 could be provided to the second shelf 205. These ramps 296/298 would be provided at appropriate angles for mobile robots to be able to move up the ramp to the appropriate respective shelves. Ramps could be used exclusively to enable mobile robots to move to respective shelf or the ramps could be used in connection with the elevator system 204, such that some mobile robots may receive instructions to move to a respective shelf using a ramp while other mobile robots may be instructed to move to the same respective shelf or different shelf using the elevator system 204.

With the existence of the elevator system 204 and/or a ramp component for access to the shelves, the availability of these mechanisms can be provided to the central control system and/or the different mobile robots such that the availability of these elevation mechanisms can be utilized by the mobile robots. Thus, for example, if a respective mobile robot is assigned to move its been containing items for picking, to the third shelf, position number four, the mobile robot may determine the available routes in order to travel to the third shelf and then move in that direction. If a ramp is available, information about any one or more of the elevation, the slope, the width, can be received such that the mobile robot can determine whether it is safe to use the ramp. The mobile robot may determine that, based on some factor, such as the weight of its payload or the height of the items within its bin, that the elevator system 204 should be used.

Other mechanisms could also be utilized in order to implement various ways of getting mobile robots up to a respective shelf for efficient use in providing items for picking or receiving items that have been picked. For example, escalator systems, temporarily extendable and retractable ramps from a respective shelf level, pulley systems, extendible and retractable shelves to receive/deliver robots to a pulley system, drones, and so forth could be implemented in the environment for the purpose of elevating mobile robots from a floor level to respective shelf.

In one scenario, a respective mobile robot having a bin 220 can be instructed to move to certain position on a shelf and remain there to provide items or to receive items into it bin. In this scenario, the entire mobile robot including a respective bin 220 would remain on the shelf and its assigned position for the picking operation. After the picking operation in which a respective mobile robot contributed items or received items in respective bin, the mobile robot within retreat down a ramp or via the elevator system 204. In another aspect, the mobile robot could be configured to deposit a bin at a shelf or floor location for providing or receiving items in the later retrieve the bin and carry it to a new destination.

The positioning of the mobile robots can have bearing on whether a picker picks from the mobile robot bin or deposits items in a respective mobile robot bin. It would be preferable to have mobile robots move on to shelves 203/205 at a higher elevation that have items that need to be picked. Mobile robots 286/288 can be positioned on a floor level such that a human picker can retrieve items from the respective bin of mobile robot 292/294, which are positioned at a higher elevation and place the items into the bins of mobile robots 286/288. A benefit of this approach is that a human picker or an automated picker is moving items from a higher elevation down with the help of gravity to a lower level. This is an ergonomic advantage in that human pictures do not need to list items up from a lower level to a higher level. The positioning of the mobile robot having a bin on a particular shelf can be determined at least in part, based on a height or physical characteristic of a human picker that will be picking items from the bin. For example, a tall human might be scheduled to work and the mobile robots can therefore move to a higher shelf than would be reachable by a shorter person.

In another aspect, the mobile robot may deposit the bin 220 on the shelf or on the floor and then retreat without the bin. In another aspect, a bin 220 may be on a shelf, and may have received the various items that are needed and a mobile robot 222 can be sent to retrieve the bin 220 for movement to another location.

Method aspects associated with the use of ramps, elevators, or other elevation mechanisms can include the various steps needed to provide instructions to mobile robot to move to certain location to be elevated to an appropriate shelf, raising the mobile robot up to the assigned shelf via an elevator system, and causing the mobile robot to move from the elevator system to a specific position on the assigned shelf. The management of the movement can include providing specific instructions to a respective mobile robot, which can then utilize wireless communication mechanisms to instruct the elevator system 204 regarding what level to raise that respective mobile robot to. A central controller 234 can also send and receive instructions to the various components for managing the movement of respective mobile robots through the system. All communication messages, such as requests, instructions, responses, confirmations, and so forth, are included as within the scope of this disclosure and included within method embodiments for enabling the movement of mobile robots through the system, of elevators, ramps, or other elevation mechanisms, to respective locations such that pickers can move items from a source bin to a delivery bin. All such communication messages can also include a retreat phase where mobile robots retreat from the respective assigned location on the shelf to a new location or where the mobile robots retrieve bins that are in respective locations on shelves.

Claims can be drafted from the standpoint of any component within this overall environment. For example, one embodiment could be from the standpoint of a mobile robot that provides instructions to an elevator identifying a destination shelf, and receiving a confirmation communication from a communication module on the elevator system. Another embodiment can include a method from the standpoint of the elevator system that receives a wireless indication from a mobile robot that identifies a destination shelf for the mobile robot, and provides a confirmation indication to the mobile robot, and then proceeds to transport the mobile robot to the appropriate destination shelf. Yet another embodiment could be from the standpoint of a central controller system that provides instructions and receives communications with respect to the movement of the mobile robot to an elevator system such that the elevator system can elevate the mobile robot to an appropriate shelf level. Systems could also be configured to include any two components, such as the elevator system and mobile robot together as a joint "system" performing the functions disclosed herein. A "system" can also include the shelf system 202 and the connected elevator system 204.

Other characteristics of the elevator can be as follows. The elevator can be connected only at the corners to the elevator framework. This leaves open each side for ingress and egress of mobile robots. The elevator floor can be configured such that when the elevator is positioned on the floor level that robots can roll onto and off of the elevator floor from the surrounding floor surface. The elevator system can have an elevator car that has an elevator floor and elevator ceiling (not shown). A pulley or cable can be connected to the elevator ceiling and a motor system for elevating the elevator car. In some aspects, the elevator can also be characterized by what it does not have. The elevator in one case does not have any doors or control buttons. There is no need for control buttons in one aspect, because mobile robots will communicate with a control module associated with the elevator system via a wireless communication mechanism, thus eliminating the need for manual buttons.

In another aspect, the elevator could be configured with the mechanical structure similar to a forklift. In this aspect, and elevator floor would be connected on one side to a structure for elevating the elevator floor. The elevator floor would not have a "fork" structure, but would be flat, such that a mobile robot could roll onto it from a floor level. The elevator floor would be open on three sides such that mobile robots could enter and leave from any of the sides. The elevator in the structure within raise the mobile robot to a particular shelf level such that a surface of a respective shelf coincides with the elevator floor such that the mobile robot can move on to the respective shelf and into an appropriate position.

Figure 2E:
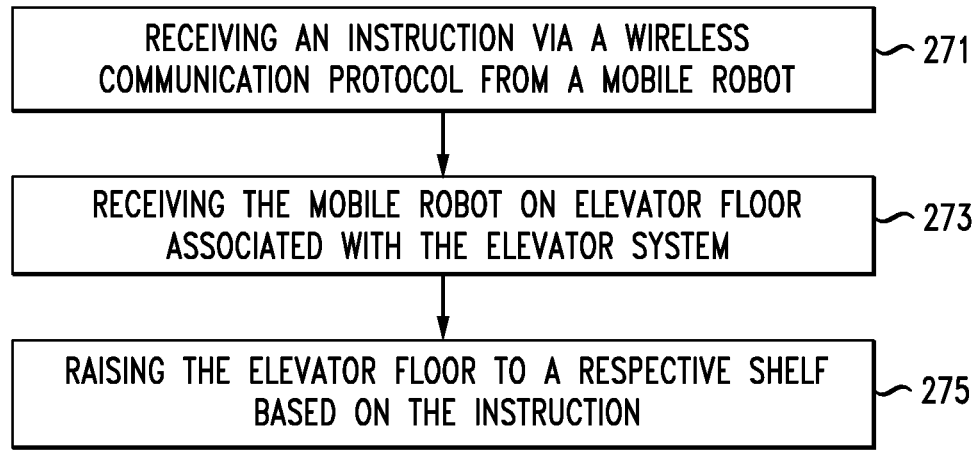
FIG. 2E illustrates a method embodiment related to an elevator.

FIG. 2E illustrates a method embodiment related to elevator usage. The method includes receiving an instruction via a wireless communication protocol from a mobile robot (271), wherein the instruction is received via a wireless module on an elevator system attached to a rack of shelves, receiving the mobile robot on elevator floor associated with the elevator system (273), raising the elevator floor to a respective shelf based on the instruction (275). The method can include returning the elevator floor to a default level after delivering the mobile robot to its destination shelf. The method can also include receiving instructions from a central control system regarding any movement of the elevator such as which level to bring a mobile robot to, which level the pick of robot from, and so forth.

Figure 3A:
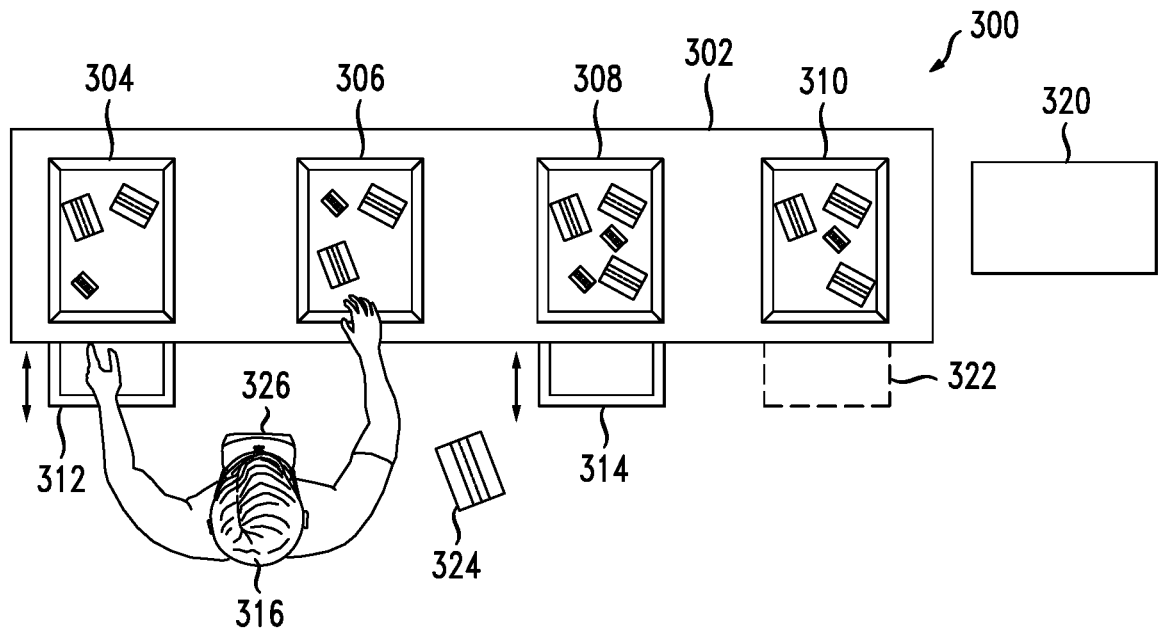
FIG. 3A illustrates an example shelf and robot environment for enabling a person to transfer items from one container to another container.

FIG. 3A illustrates a user 316 who will implement the transfer of items from source containers 304, 306, 308, 310 to destination containers 312, 314, 322.

In this embodiment, it is assumed that containers on a shelf are properly positioned and that robots on the floor with containers are properly positioned as well. This figure illustrates a top view 300 of a rack of shelves 302 with containers 304, 306, 308, 310. A communication unit 324 can communicate with the control center 320. The aspect of the disclosure that is illustrated in this figure includes a movement of the low-profile robots 210, 222 on a floor level 318 to make easier the transfer of items from a respective source container to a respective destination container which is configured on a respective robot. The user 316 is given instructions via a virtual/augmented reality headset 326, audible instructions, visual instructions, and so forth. In the example shown in FIG. 3A, the user 316 is given instructions to move an item from container 306 and place it in recipient container 312. The user is standing in the aisle in front of the rack of shelves 302. To make the transfer of items easier, a robot that has configured on the recipient container 312 moves out into the aisle. Thus, the user does not have to reach underneath the lowest shelf to place the item in the recipient container 312. Further, the user may only be told to retrieve and place two items from container 306 into each recipient container. The system could cause recipient container 312 to be moved into the aisle as well as recipient container 314. Thus, which containers receive the designated number of items can be identified to the user by virtue of which containers are moved into the aisle. The user can use a barcode reader 324, or any other mechanism disclosed herein, to confirm that the appropriate number of items are retrieved from the source container and delivered to the appropriate destination container or destination containers. The robots, having received and confirmed the items in their respective containers, will slide back underneath the shelf so they are no longer protruding into the aisle. Feature 322 illustrates that a robot is underneath container 310, but has not yet moved at least partially into the aisle to retrieve items. Feature 322 could represent the next container that will be receiving items from the user 316. For example, once container 312 and 314 retreat back under the shelf, the user could be instructed to retrieve five items from container 310 and place them in the destination container. At this stage, container 322 could move partially into the aisle thus indicating that it is the container that should receive the five items from container 310.

It is noted that the system can also adjust the amount of movement of the robots into position to receive items in their respective containers. For example, for single or small items, the robot may only need to move a small amount into the aisle to make the recipient container easily accessible for the user. Larger items may require the robot to move more into the aisle. A particular configuration of a destination container may also be an indicator of how much the system 320 will instruct a low-profile robot to move into the aisle for receiving items from the user. Furthermore, one or more user characteristics such as their height, their weight, their arm length, their age, their gender, their historical information with respect to how they manually transfer items from one container to another, etc., can all be taken into account in a determination of how much to move a robot into the aisle for that particular user.

Additionally, as can be seen in FIG. 3A, having a recipient container move into the aisle right in front of the user 316 might be problematic. For example, if the user was retrieving an item from container 306 and a low-profile robot was immediately under container 306 and then moved into the aisle to retrieve an item, the robot might literally run into the user 316. This particular issue might have bearing or be more important for a user with a short arm length. Thus, user characteristics such as their height and arm length can have bearing on whether a recipient container would ever be moved into the aisle in a position right in front of the user for receiving items. Thus, the system can configure a positioning of destination containers underneath the shelves in such a way as to be more efficient for individual users. A short user with a short arm length might only have movement of destination containers on an adjacent position as is shown in FIG. 3A. A taller user with a longer arm length might have destination containers moved into position directly in front of them for dropping in items as instructed.

The containers as disclosed herein can also be modified to aid in the efficiency of the process. Containers can include sensors such as motion detectors, weight detectors, light detectors, GPS locators, ID tags, barcodes, scanners, and so forth.

In another aspect, FIG. 3A can represent another approach to what can be called hybrid zone picking. In this scenario, a robot can bring a cart to a right side of an aisle having a shelf 302 with source bins 304/306/308/310. Feature 320 of FIG. 3A in this case can represent a robot delivering the cart. Of course the cart can be delivered to any desired location. The human 316 can push the cart through the aisle picking the right items from the various respective source bins as instructed and then can drop the cart off at the end of the aisle, on the left side of FIG. 3A, for a robot to then take to its next picking location or if done, to packing and shipping.

This hybrid zone picking approach can be achieved via the system utilizing a mobile robot to first deliver the cart having a destination bin to a particular location associated with an aisle or within the aisle, which is appropriate for a human user to begin pushing the cart through the aisle and picking items for placement within the cart or a bin on the cart. The cart can have location based technology built into the cart such that the system can track the movement of the cart through the aisle. The cart may also not have any such tracking technology but the system may utilize a device 324/326 associated with the user that can identify the user's movement, and thus the cart's movement, down the aisle. Such tracking can aid the system such that a robot can retrieve the cart at the end of the aisle or at the end of the picking operation for that aisle. The system instructs a pick-up robot to retrieve the cart and move it to its next picking location or to packing and shipping.

As noted above, such a cart may have no special technology associated with the cart for tracking or other purposes. However, given the use of the cart, as disclosed herein, the cart could have special technology built-in, such as location-based technologies, gesture detecting technologies, fingerprint readers for identifying the user pushing the cart, facial recognition technology for identifying the user, weight detecting technologies, such as scales, to identify if the appropriate amount of expected items are placed within the cart, and so forth. The cart could also be a robot in itself, such that the user might not even need to push the cart manually but can maintain their hands free to pick items from source bins to the cart.

For example, the cart could be configured with a module that detects a distance that the cart is away from a waste or a middle section of the human user. Robotic technology on the cart, could be configured to maintain a 10 inch distance away from where the user is standing. In this respect, the user could have the cart configured in front of him or her and walked down the aisle picking items from source bins 308 or 310 and place the items from the source bins into the cart while the cart automatically maintaining a distance of 10 inches in front of the user. This process and technology would eliminate the need of the user to manually place their hands on the cart to push the cart forward and would free up the user's hands to be more efficient and picking items and placing them in the cart. The cart may also have communications capabilities to communicate with the system, a central controller, user devices, devices on a shelf system 302, devices within source bins, or any other component within the warehouse disclosed herein.

In one aspect, the cart itself is part of or is moved by a mobile robot through the aisles as described or can be a "dumb" cart that is moved to the proper location by a robot, manually handled by the user, and retrieved by a robot as described above.

The system moves the cart, in the various ways described above, to the proper destination within an aisle, knowing the items to be picked from source bins and to be placed within the cart. The system can evaluate and track the performance of the user such that a confirmation can be achieved that the expected items were accurately picked from the proper source bins and placed within the cart. Devices associated with the user can provide instructions and directions as disclosed herein, to perform the picking operation. Assuming that the picking operation was successful or successful, to a certain threshold, the system can then retrieve the cart via a robot for its next destination as described.

Figure 3B:
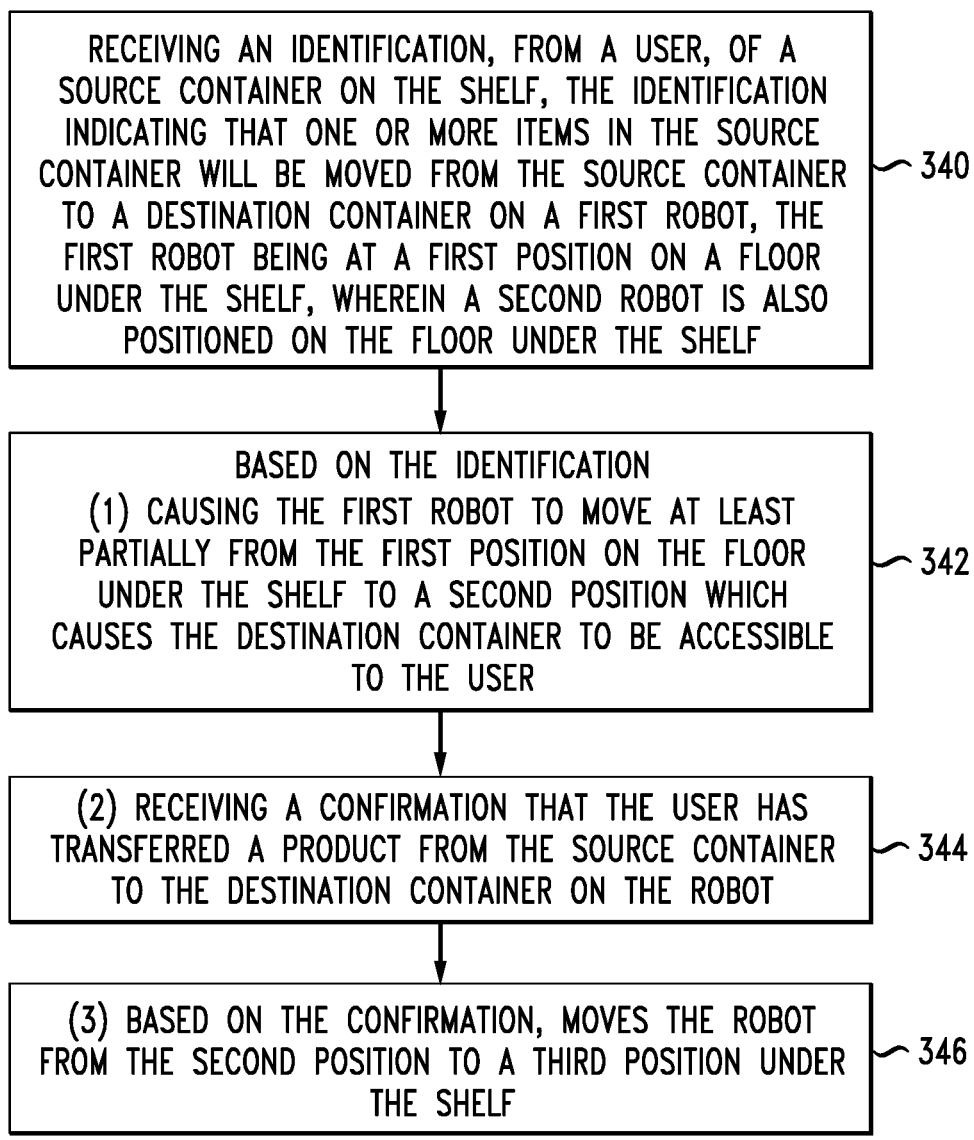
FIG. 3B illustrates a method example for using the shelf and robot environment for enabling a person to transfer items from one container to another container.

FIG. 3B illustrates another method embodiment. A method in this regard includes receiving an identification, from a user, of a source container on the shelf, the identification indicating that one or more items in the source container will be moved from the source container to a destination container on a first robot, the first robot being at a first position on a floor under the shelf, wherein a second robot is also positioned on the floor under the shelf (340). Based on the identification, a system (1) causes the first robot to move at least partially from the first position on the floor under the shelf to a second position which causes the destination container to be accessible to the user (342), (2) receives a confirmation that the user has transferred a product from the source container to the destination container on the robot (344) and, (3) based on the confirmation, moves the robot from the second position to a third position under the shelf (346).

The first position and the third position are approximately the same position. A first bar code scan of a bar code on the source container can be used to receive the first identification and a second bar code scan can be used to receive the confirmation. Other mechanisms can also be implemented for providing confirmation of the transfer of items from one container to another. For example, a first motion detector can be used to receive the identification, and a second motion detector is used to receive the confirmation. The steps can be iteratively applied, such that multiple items from different containers can be moved from the respective source container on a shelf to a respective recipient container positioned on a robot on the floor. In another aspect, an indication can be given to the user to retrieve an item from a particular container, and deposited in a particular destination container.

In yet another aspect, motion detection can be utilized such that a user may simply reach into a first source container which can trigger the control system to identify which source container is being accessed, at which point the instruction can be provided to the user and to one or more robots on the floor to indicate how many items the user should retrieve from the source container and how many items to place into each of one or more robots which move into a new position on the floor to retrieve one or more items. Thus, in this regard, the user may not be confined to accessing the source containers in any particular order, or according to any particular instruction. If there are multiple shelves, each containing source containers, the user can simply start and access the containers on any shelf as they desire and receive dynamic and relative instructions with respect to how many items to retrieve from each container and where to deliver those items based on which robots move from underneath the shelf in these partially into an aisle for retrieving the items.

The method can include iteratively applying the receiving of the identification step, the causing the first robot to move, and the receiving of the confirmation steps for a plurality of source containers and a plurality of robots having a plurality of destination containers.

The plurality of robots can be positioned on either the floor or a first shelf above the floor and accessible by a ramp. A robot can position the source container and a plurality of source containers on one or more shelves such that the user can transfer product from the source container and the plurality of source containers in succession. A product characteristic can be used to base a source container position of the source container on the shelf relative to a second shelf and relative to other source containers having other products.

Figure 4A:
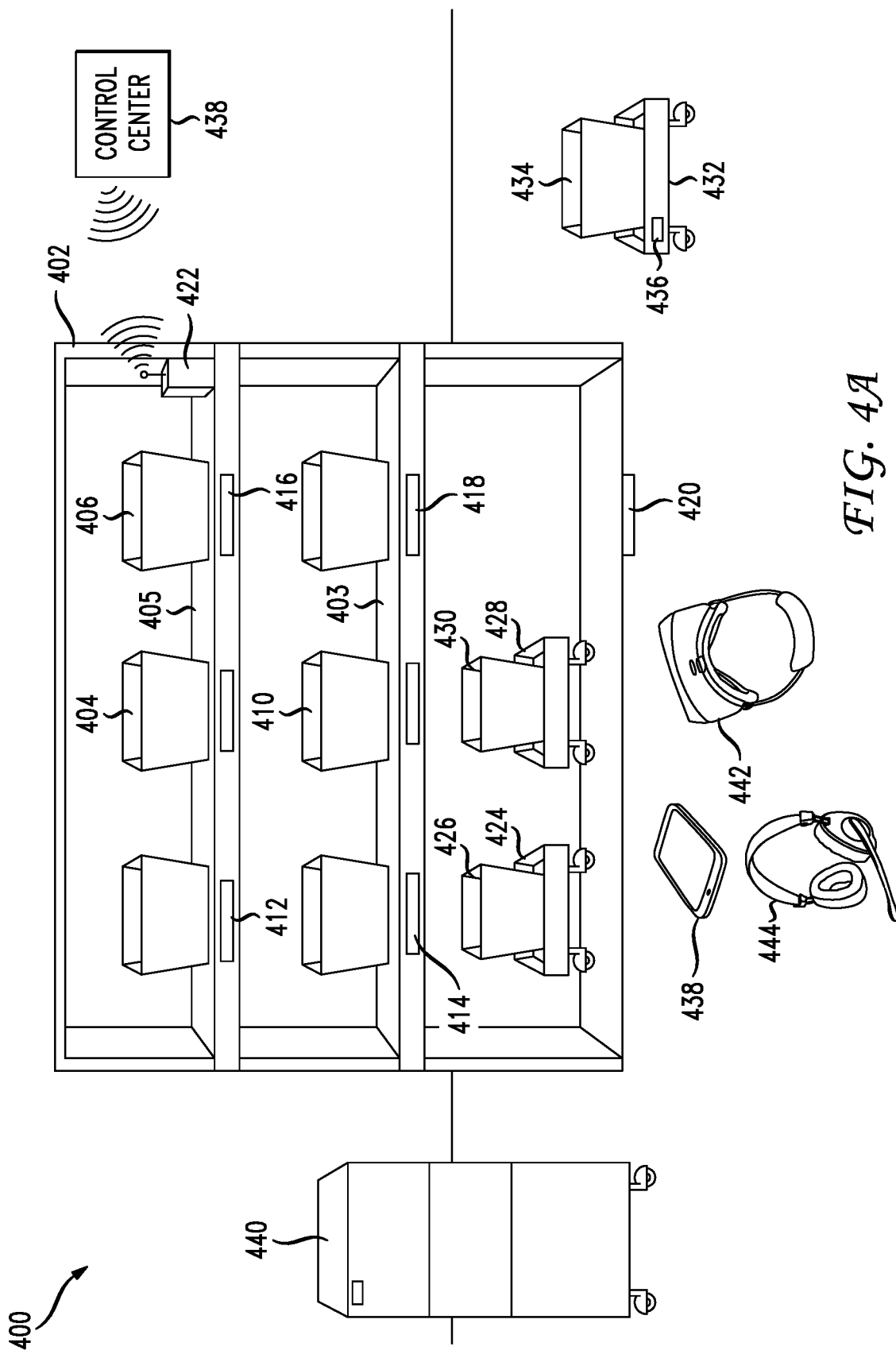
FIG. 4A illustrates a shelf and robot environment for enabling the user to transfer items from one container to another container.

FIG. 4A illustrates another aspect of this disclosure, including the system 400. The system 400 illustrates in more detail a specialized shelving system 402. Shown in this figure are a number of source containers 404, 406, 408, 410. A first shelf 403 and a second shelf 45 are shown as well. This figure also shows confirmation units 412, 414, 416, 418 and 420. As noted above, these can represent a number of different types of confirmation units. For example, each of these units can represent a scale that the respective container rests upon. The scale can be used to identify whether items have been added to a respective container or remove can route from a respective container and how many items were added or removed. The respective component can also record a timing of when the item is removed and how long it takes to remove or add the item. In some respects, the respective component can be positioned below a respective container for purposes of managing and determining the weight.

In another aspect, for example, component 416 can be positioned above a container 408 and can be utilized for motion detection. In this regard, the system could be implemented such that the user can simply stand at the rack 402 and start to reach in the container 408. The user might simply be moving from right to left and from container to a container. In this aspect, the user can simply begin to reach into container 408, and a detection component 416 can identify that the user is beginning at that container. The system can also include a gaze detection system which can detect where a user is looking and thereby process that information to determine what information to feed to the user. The system, based on the motion data or the gaze data, can then instruct the user via a mechanism such as virtual/augmented reality goggles 442, or an audible headset, or some other means that they need to retrieve and place two items from container 408 to each of containers 430 and container 426. It is noted that a headset 444 can also be used for voice picking as well. The user in that case would wear headphones that may or may not also include a microphone for receiving voice input from the user. The headphones can provide audible instructions to the user and the microphone can receive voice confirmations, commands, questions, and so forth from the user. The headset can include attached or separate communication module, which can communicate with the central controller, such that instructions can be provided in audible signals to be communicated between the headset and central controller for managing a picking operation by a user. These containers are respectively positioned on low-profile robots 428 and 424. The person could then simply reach into container 426 and immediately be told to grab three items from that container and place them in the container 430. Each of the mobile low-profile robots can include a control or communication unit 436 as is shown on robot 432 having container 434. The various components in the shelving rack 402, respective low-profile robots 424, 428 and 432 as well as a drawer swapping robot 440 can communicate wirelessly or in a wired manner with a control center 438 which can coordinate the movement of the low-profile robots to the respective positions and coordinate instructions to an individual (e.g., 442) to move items from a source container to a destination container.

In one example, the sensing unit 414 can be a motion detector that can detect the recipient motion of an item being placed into recipient container 426. Component 438 represents a scanner that the user can use to scan barcodes on respective containers when items are retrieved from the respective container and placed within a respective destination container. For example, the user can hold the barcode reader 438 in their left-hand and use the right hand to retrieve and deliver items between containers. All of the movement of items and the confirmation data is coordinated with the control center 438.

Figure 4B:
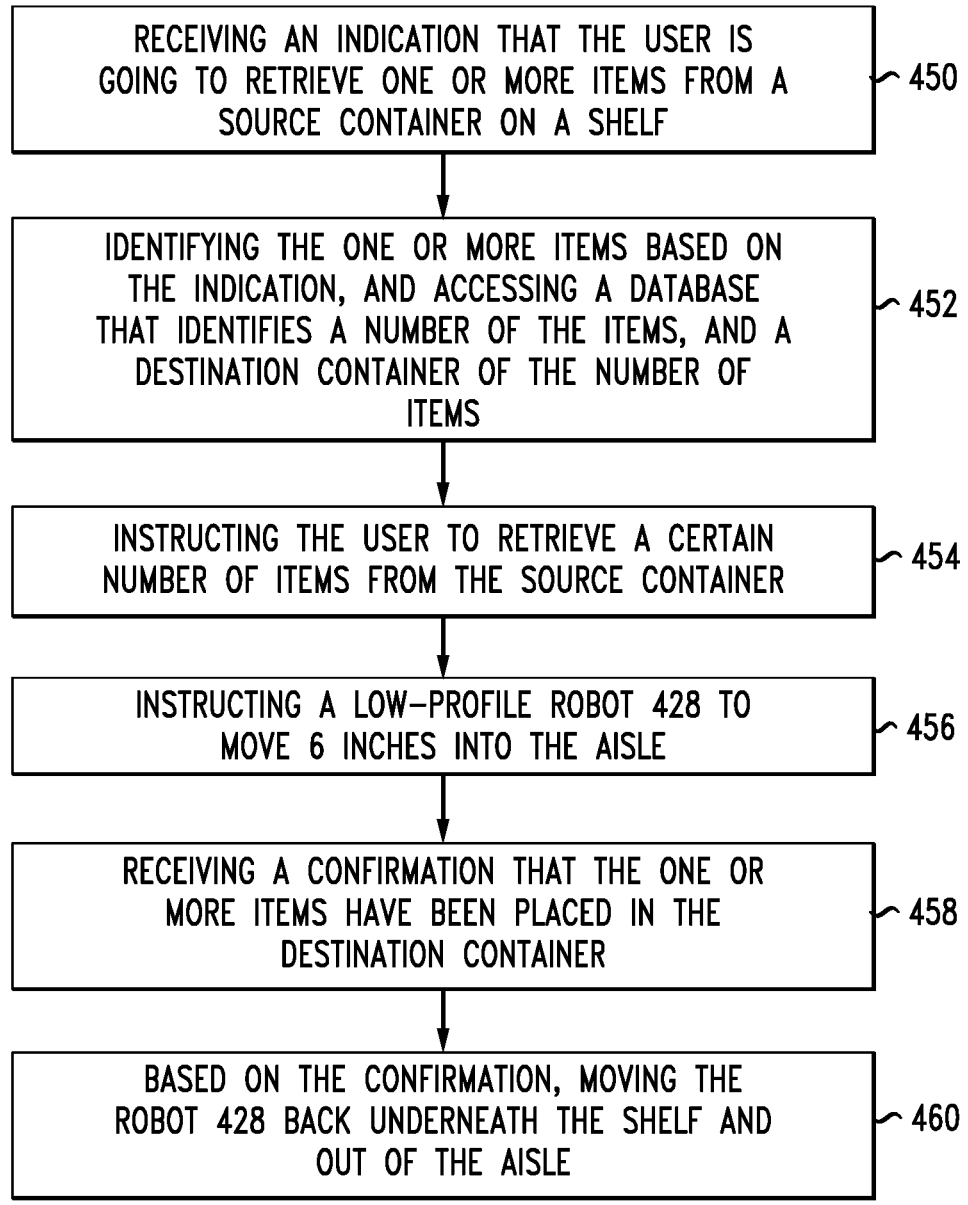
FIG. 4B illustrates a method used in the shelf and robot environment for enabling the user to transfer items from one container to another container.

FIG. 4B illustrates a method embodiment in the context of the control center 438 receiving data and providing instructions. In one aspect, the method relates to how to provide instructions to the system which can include one or more low-profile robots 424, 428, 432, and how they should position themselves for easy reception of items in their respective destination container 426 430, 434. A control center 438 receives data from one or more indicators, such as a scanner 438 or various sensors 416, 418 it provides instructions to a user via mechanism such as an audible system, virtual/augmented reality glasses 442, a headset 44, or other means. The system 438 can also receive wireless data from a communication unit 422 associated with the rack of shelves 402.

The steps of the method occur within the control center 438, but can involve communication to or from any of these components. The method includes receiving an indication that the user is going to retrieve one or more items from a source container on a shelf (450), identifying the one or more items based on the indication, and accessing a database that identifies a number of the items, and a destination container of the number of items (452). In one example, the database that identifies where items should flow through a warehouse can include instructions or data such as that five bars of soap need to be transferred from a source container 416 to each of a destination container 430, 434. The control center 438 will access this information. Based on this information, several tasks may occur. These operations include instructing the user to retrieve a certain number of items from the source container (454). As noted above, this can include an audible instruction, a virtual/augmented reality instruction, a haptic instruction, a light based instruction, a graphical user interface instruction, and so forth. There are any number of mechanisms by which the user can be instructed to retrieve a certain number of items from the source container.

Next, the user needs to know where the items are to be delivered. The control center 438 can then instruct a low-profile robot 428 to move a distance (e.g., 6 inches) into the aisle (456). This movement can represent an indication to the user of the destination location for the items. The user would then place the designated number of items into the destination container 430. The method next includes receiving a confirmation that the one or more items have been placed in the destination container (458). The confirmation can occur in any number of ways as disclosed herein.

Based on the confirmation, the method includes moving the robot 428 back underneath the shelf 403 and out of the aisle (460). Other steps in this process could include providing instructions to two or more low-profile robots such that the user knows if two robots are moved out into the aisle, that they should each receive a number of items. The number of items may be the same or different. This process is repeated as the user continues on to each source container 404, 410, 408, and so forth. Thus, the user only needs to identify the source container that they are now focused on in the system will dynamically provide both the instructions on how many items to retrieve, and provide, or cause the movement of the appropriate robot to identify a recipient location for the items. The instruction to the user can identify which robot to deposit items with as well.

The positioning of the robots on the floor can also be such that a particular robot may retrieve all of the items that it needs and can thus move to another destination for processing those items. For example, if the user retrieves five items from source container 406 and ten items from source container 408 and places all of those items into a destination container 434, those may be the complete items needed in the destination container 434. In that case, robot 432 can receive instructions via its communication unit 436 to move to a new location to deliver the items for shipment to a customer or some other location. Meanwhile, a replacement robot can be moved into position of above the sensor 420 or below the container 408 and can be ready to receive instructions from the control center 438 with respect to when it should move into the aisle to retrieve additional items as the user processes the source containers.

Figure 5A:
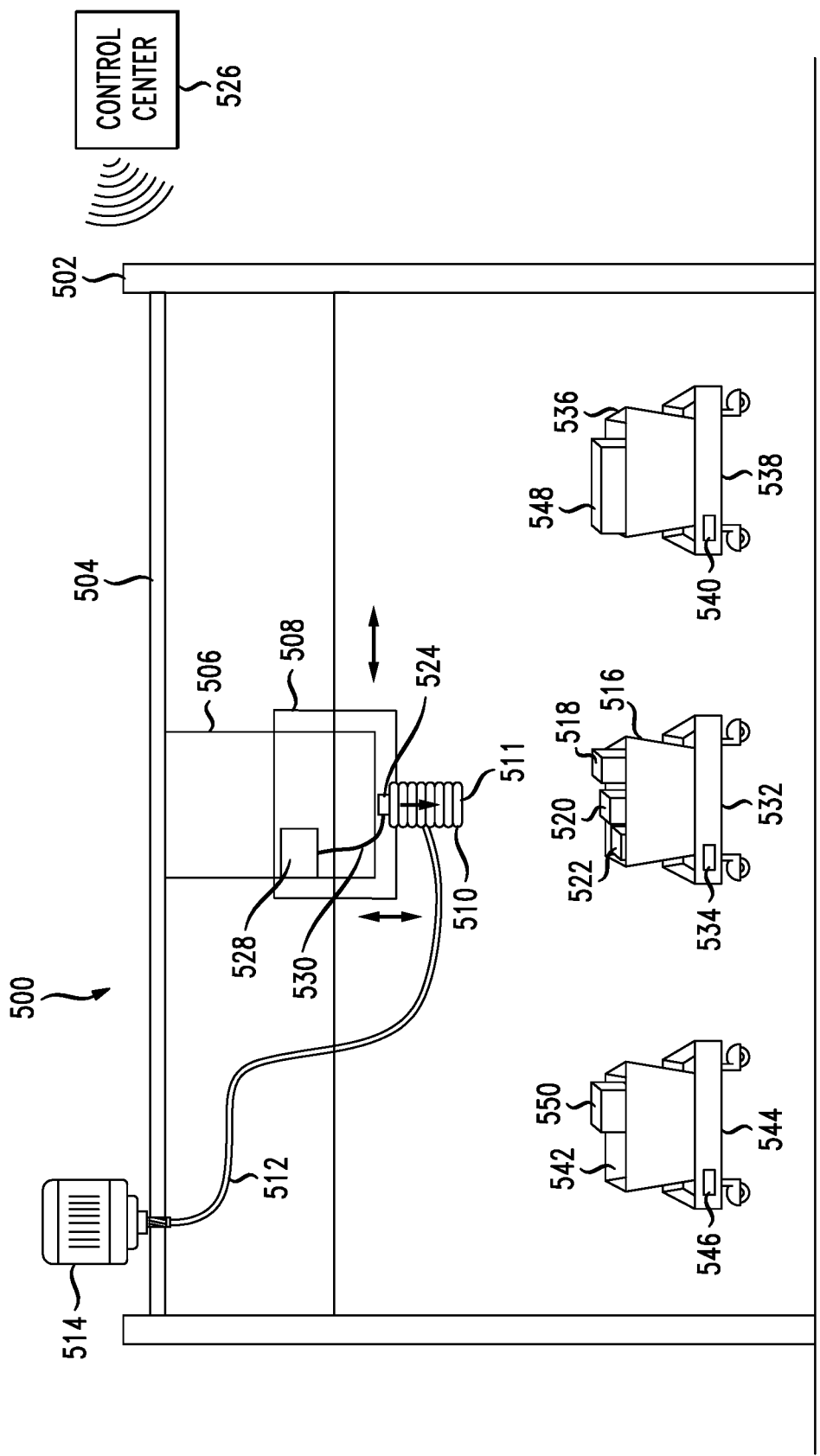
FIG. 5A illustrates a system having two-dimensional movement for use in a robotic environment for transferring items from one container to another container.

FIG. 5A illustrates another example system 500. This embodiment involves utilizing a suction cup robot 502 having only 2 degrees of freedom in which is positioned to interact with multiple robots 544, 534, 538, each of which has a container 542, 516, 536 configured thereon, such that multiple robots will move into position and the suction cup robot will retrieve items from a source container 516 and deliver them to a destination container 542, 536. The suction cup robot 502 includes a mechanism which enables a suction head 510 to be moved in a horizontal direction 504, as well as in the vertical direction 506. A structure 508 can be attached to the suction unit 510. An airline 512 can be connected to a suction unit 514 such that when the suction unit 510, which has a flexible ribbing and an open middle area, comes into contact with an item, such as item 520, that unit 514 because of the air pressure within the suction end 510 to reduce and thus attach item 520. As can be appreciated, because of the flexible rib nature of the walls of the suction end 510, when it comes into contact with an item 518 or item 522 that has an angled surface, it can be flexible and still aligned its surface 511 with the surface of the item. Then, the suction unit 514 can draw the air out of the suction unit 510 and cause an attachment to the respective item. It is noted that within unit 508, a video camera 524 can be included such that the configuration of the various items within source container 516 can be viewed and the positioning of the suction end 510 can be more strategic. A video feed from the camera 524 can be provided to a communication unit 528 via a communication cable 530 or other wireless means. The control center 526 can control the number of items retrieved from the source container 516 and delivered to one or more destination containers 542, 536.

Figure 5B:
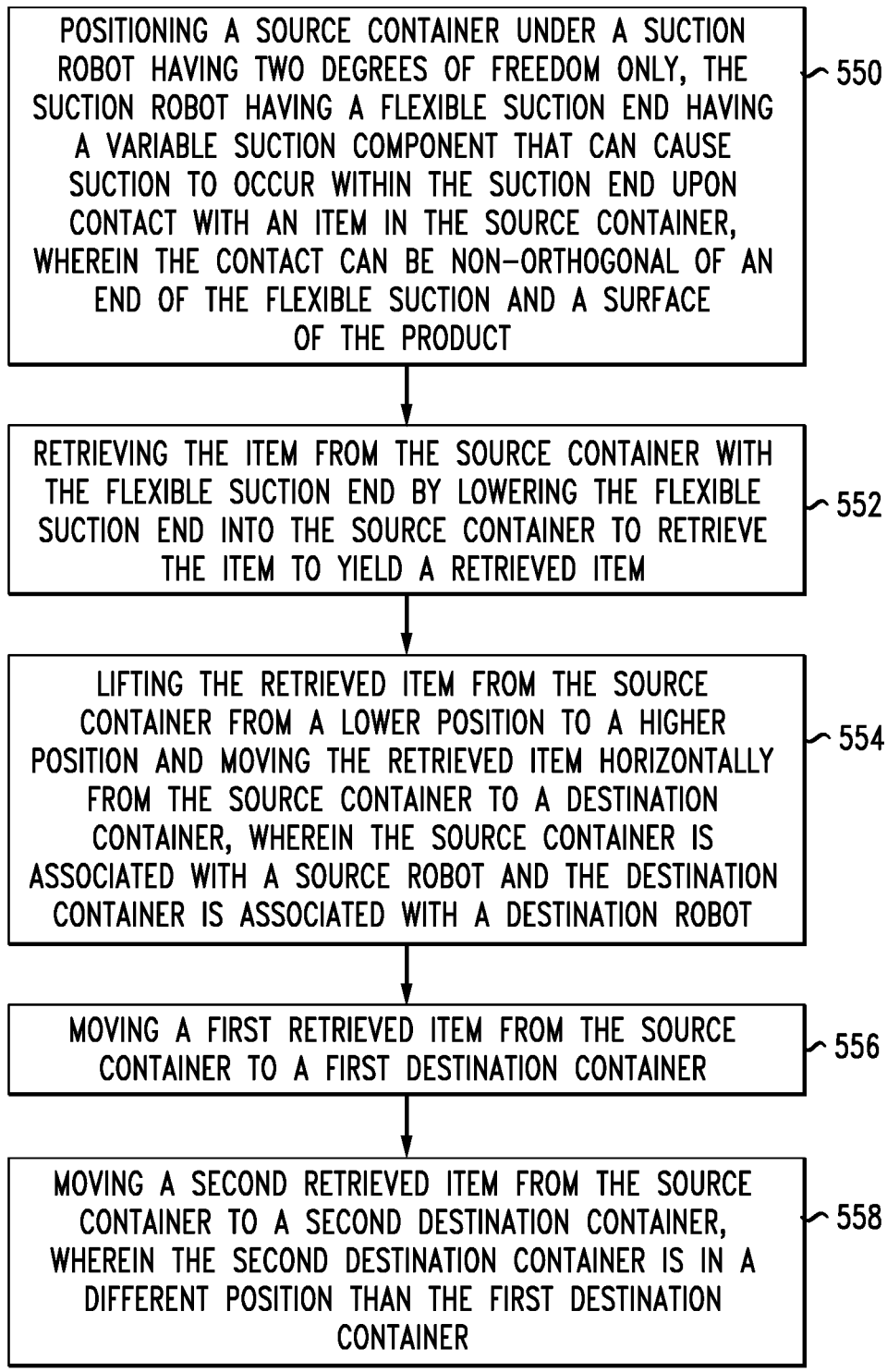
FIG. 5B illustrates a method of using a robot having two-dimensional movement for use in a robotic environment for transferring items from one container to another container.

FIG. 5A illustrates one item 550 in a destination container 542 and another item 548 in a destination container 536. FIG. 5B illustrates a method aspect of this disclosure. A method involving the two dimensional suction robot disclosed in FIG. 5A includes positioning a source container under a suction robot having two degrees of freedom only, the suction robot having a flexible suction end having a variable suction component that can cause suction to occur within the suction end upon contact with an item in the source container, wherein the contact can be non-orthogonal of an end of the flexible suction and a surface of the product (550).

The method can involve retrieving the item from the source container with the flexible suction end by lowering the flexible suction end into the source container to retrieve the item to yield a retrieved item (552), lifting the retrieved item from the source container from a lower position to a higher position and moving the retrieved item horizontally from the source container to a destination container, wherein the source container is associated with a source robot and the destination container is associated with a destination robot (554).

The source robot can be moved into a position under the flexible suction end as directed by a control entity. The destination robot can be moved into a second position near the first position such that the suction robot can transfer the retrieved item to the destination container. The method can further include providing, via a control entity, a number of items to be moved from the source container to the destination container. The method can also include moving a first retrieved item from the source container to a first destination container (556) and moving a second retrieved item from the source container to a second destination container, wherein the second destination container is in a different position than the first destination container (558).

In one aspect, the flexible suction end includes a central open portion having a camera that is positioned to view the item from a viewpoint of the flexible suction end. In this regard, the method can include retrieving the item from the source container with the flexible suction end by lowering the flexible suction and into the source container utilizing feedback at a control entity from the camera that is positioned to view the item from the viewpoint of the flexible suction end. The feedback from the camera can include video, images, audio, etc. The feedback can capture positioning information (e.g., a position of the item, a position of the flexible suction end, a position of a container, a texture of a surface of a container of an item, etc.), size information, context information (e.g., surrounding conditions, etc.), movement, and so forth.

Another aspect of this disclosure can include a method performed by the control center 526. The control center can provide instructions to the suction robot 502 with respect to how many items to retrieve from a source container 516 and where to place a respective number of items with respect to one or more destination containers 542 and 536. In this regard, the control center can manage or instruct robots to move into either an initial position as a source container or into a position as a destination container. Then, the control center 526 can provide instructions to the suction robot 512, with respect to the number of items to move from one container to another container. The source container does not have to be in the middle of the suction robot 502 as is container 516. For efficiency, the control center could have an open position, for example, where robot 538 is shown in FIG. 5A. This could be because a destination container 536 could have received all of the necessary items at the station of the suction robot 502 and may have moved on to another destination. The control center 526 could cause instructions to a robot to retrieve a source container having forty items for delivery to one or more destination containers. Thus, the control center 526 could move the source container into the position where robot 538 is shown. The suction robot 502 would then receive instructions that the new source container is found in that position and once recipient containers are positioned elsewhere in the proper positions, the suction robot 502 can initiate the transfer of items from the new source container to new destination containers. The control center 526 has a larger view of the overall movement of items through the warehouse, and thus can position source containers in destination containers as necessary.

Figure 6A:
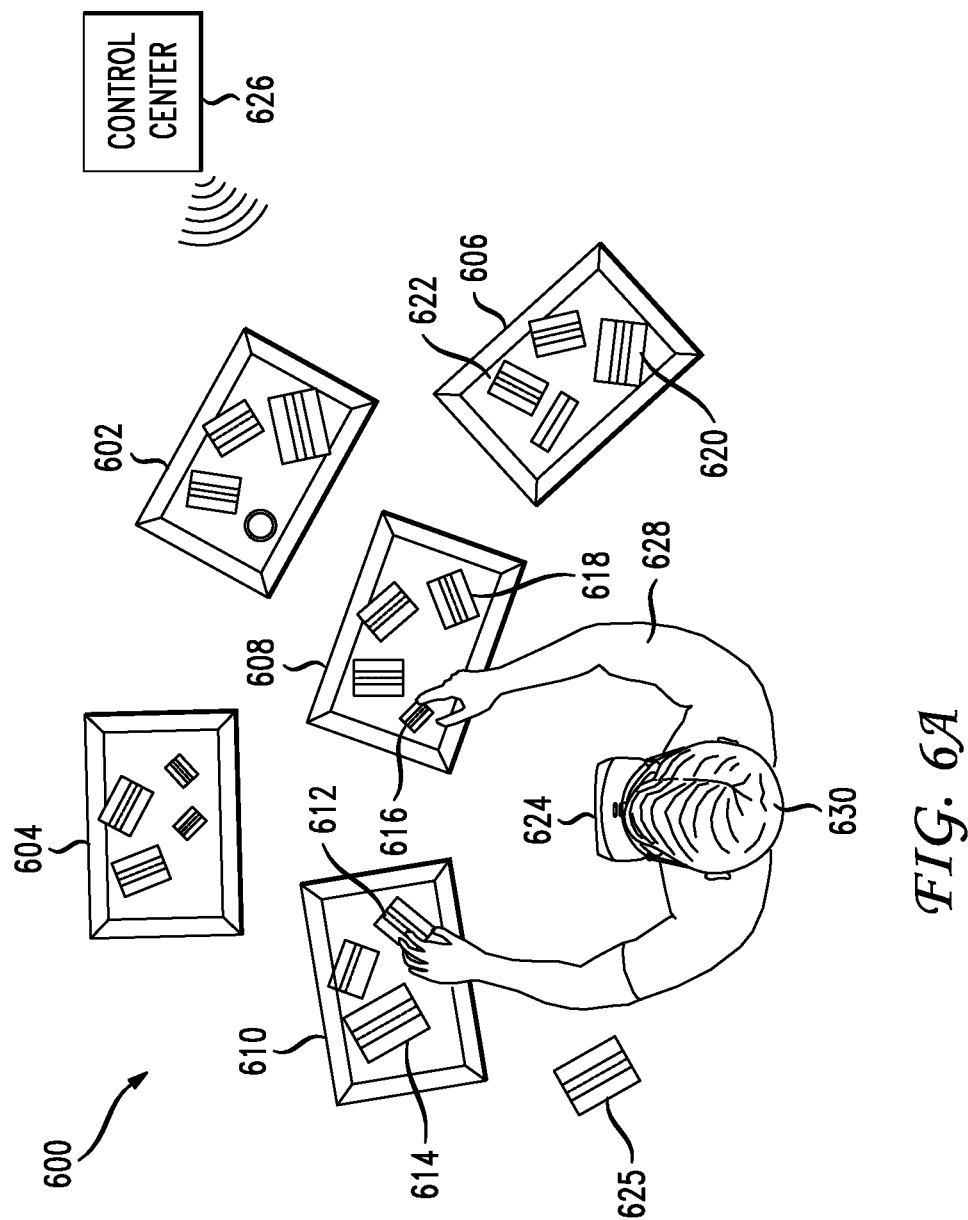
FIG. 6A illustrates a diagram moving a plurality of robots into specific positions to enable a user to move items from one container to another container.

FIG. 6A illustrates another aspect of this disclosure. An ergonomic approach 600 is disclosed to enable a person 630 to transfer items from a source container 608 to a destination container 610 from a sitting or standing position via the control of robots being positioned in an easily accessible location around the user 630. For example, the user could be sitting on a chair and multiple elevations of semicircular shelves around the user could be configured such that robots configured with containers 606, 608, 610, 604, 602 can move in position themselves with an easy arm reach 628 of the user. Virtual/augmented reality goggles 624, audible instructions, haptic instructions, light based instructions, or any combination thereof can then instruct the user to transfer one or more items from a source container 608 configured on a robot to one or more destination containers 610 or 606 configured on other robots. Once a transfer is complete, the one or more robots can then retreat to other destinations, and other robots can be positioned for additional transfers. Example items 616, 618, 612, 614, 622, 620 are shown. The control center 626 manages the instructions to robots to move into respective positions and then coordinates the instructions to the user 630. A unit 625 can be used to scan a container that is the current focus of the user 630 such that instructions can be triggered based on the scanning event on what to do with respect to items being moved. The device 625 can also be used to confirm when actions have been completed. Motion detection, weight scales, verbal commands, can also be built into the system such that confirmations and instructions can be more efficient. The scheduling and positioning of robots can also take into account the particular worker 630 and their arm span 628, height, work history, need for adjustment of the types of repetitive movement that is needed, and so forth.

Figure 6B:
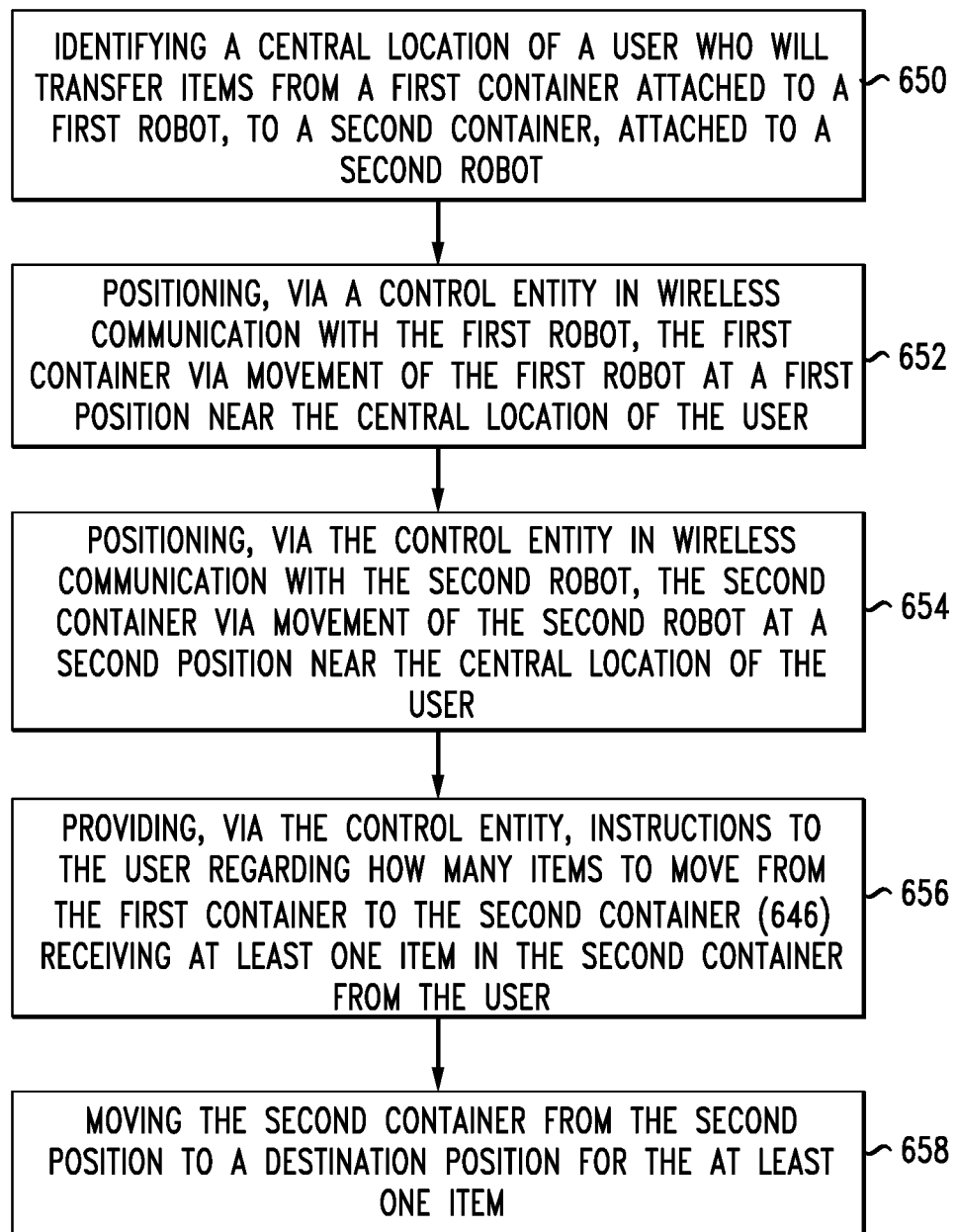
FIG. 6B illustrates a method of positioning a plurality of robots such that a user can transfer items from one container to another container.

FIG. 6B illustrates a method aspect of this disclosure. A method in this regard includes identifying a central location of a user who will transfer items from a first container attached to a first robot, to a second container attached to a second robot (640), positioning, via a control entity in wireless communication with the first robot, the first container via movement of the first robot at a first position near the central location of the user (642), positioning, via the control entity in wireless communication with the second robot, the second container via movement of the second robot at a second position near the central location of the user (644), providing, via the control entity, instructions to the user regarding how many items to move from the first container to the second container (646), receiving at least one item in the second container from the user (648), and moving the second container from the second position to a destination position for the at least one item (650). The first position can be at a different elevation than the second position. The instructions to the user regarding how many items to move from the first container to the second container can include one or more of audible instructions, visual instructions, haptic instructions, text instructions, and multimodal instructions. The method can include positioning, via the control entity in wireless communication with a third robot, a third container via movement of the third robot at a third container position, the third container position near the central location of the user, providing, via the control entity, instructions to the user regarding how many items to move from the first container to the second container and the third container, receiving at least one item in the second container from the user and at least one item in the third container from the user, moving, via the second robot, the second container from the second position to a destination position for the at least one item in the second container and moving, via the third robot, the third container from the third container position to a destination position for the at least one item in the third container.

Figure 7:
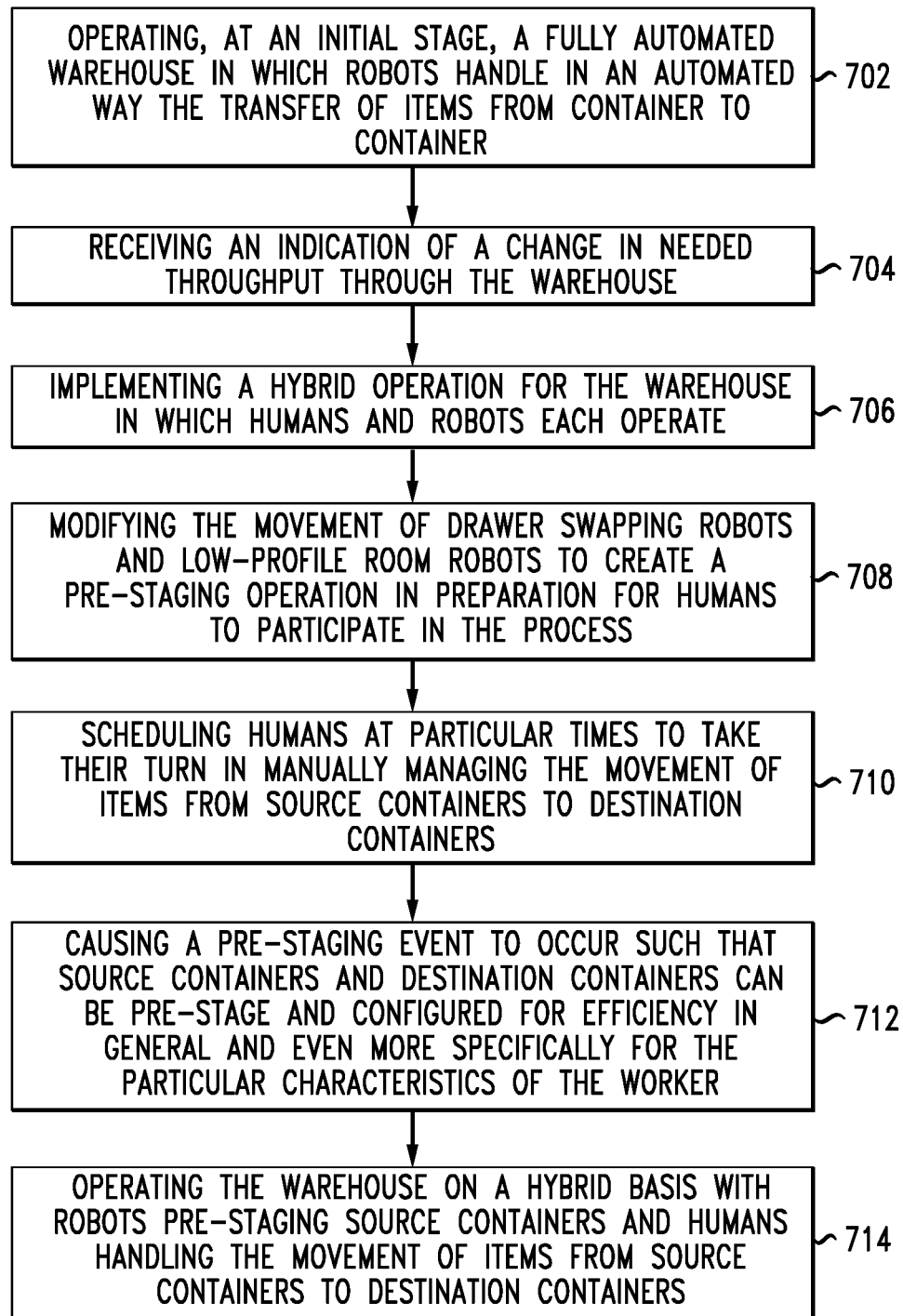
FIG. 7 illustrates a method of operating between a fully automated and hybrid warehouse environment.

FIG. 7 illustrates a hybrid operational method of this disclosure with respect to how a warehouse could involve both humans and robots in moving items through from source containers to destination containers. One benefit of the overall approach is that it enables a scaling up of throughput in times of high volume when necessary.

The scaling up generally can occur as follows. In one aspect, a warehouse might be completely robot automated such that robots position items in containers on shelves and other robots implement the transition of items from a source container to a destination container in a completely automated fashion. In this respect, a method can including operating, at an initial stage, a fully automated warehouse in which robots handle in an automated way the transfer of items from container to container (702). However, information about the needed throughput through the warehouse might indicate that there is going to be a spike in needed throughput because of, for example, a holiday such as Christmas or Hanukkah, weather events such as a hurricane, or for any other reason. The method could include receiving an indication of a change in needed throughput through the warehouse (704). Because a completely automated system will basically have preprogrammed throughput thresholds, when a spike in throughput is needed that exceeds a completely automated system threshold, the control center 234 can implement a hybrid operation for the warehouse (706), such that the following one or more items occur.

First, the movement of drawer swapping robots and low-profile room robots can be modified to create a pre-staging operation in preparation for humans to participate in the process (708). Humans can also be scheduled at particular times to take their turn in manually managing the movement of items from source containers to destination containers (710). The system can take into account its existing data about humans that will participate in the process. For example, height, strength, gender, age, schedule, social media information which might be related to their availability, such as birthdays, holidays, anniversaries, and so forth. The system can utilize data about the team of individuals that can be available for scheduling. The system 234 can then select the individuals that are available and capable to be scheduled. The system can then utilize that data about the individuals and their capabilities, height, and so forth, and cause a pre-staging event to occur such that source containers and destination containers can be pre-stage and configured for efficiency in general and even more specifically for the particular characteristics of the worker (712). Thus, the system could have the exact same set of items that need to be transferred from source containers to destination containers on the first day and a second day. Because John might be scheduled on the first day, the pre-staging might utilize the top three shelves of the rack 202 and be configured in a certain way customized or tailored for John based on information about John such as height, arm span, work history or patterns, etc. The next day, Mary might be the worker and the pre-staging might be configured different based on Mary's characteristics. The system then operates on a hybrid basis with robots pre-staging source containers and humans handling the movement of items from source containers to destination containers (714). The system can continue to adjust the scheduling, pre-staging, and operations as necessary to fit current and/or future needs.

Once the spike in activity is complete, the control system can either remove human scheduled times or stop scheduling human workers and return the warehouse to the fully automated robot based operational mode. The control system can include the functionality of communicating any such decisions to managers and human workers. The control system can automatically identify the current or future spikes and/or needs, schedule users and operations, manage the warehouse operations and devices, troubleshoot conditions, generate confirmations, report errors, request help, capture operational intelligence and statistics, etc. The information can also be coordinated and span across multiple sites and include details about a transportation system between sites.

It is noted that in a number of the concepts disclosed above, that humans need to be able to quickly and accurately identify a right location or a bin for retrieving an object, placing an object, moving the bin, and so forth. A respective bin can include a component such as an easily identifiable icon that enables a human user to accurately identify the right location or been. This can be a static component such as a yellow dot glued to the bin or it can be a dynamic electrical component such as a dynamic display that can turn green or red or yellow, depending on what signal needs to be sent to the human user that needs to be able to identify the location or the bin. Haptic signals could also be built into bins, headsets, hand-held devices, clothing, and so forth. The dynamic component can be battery-powered, include computer components, as disclosed herein, and can include a communication mechanism, such that as the user is in the process of being instructed on how to move objects from one bin to another, and easily identifiable icon or graphic, which can include sound or vibration, can aid the user in more accurately identifying the right location or been for retrieval or deposit of objects. A respective dynamic device can communicate with the central controller, a handheld device of the user, a headset, goggles, a robot, and/or any other component in order to provide a proper timing and icon configuration, color, design, audible signal, other identifying mechanism to make the process more efficient, such that the human user can more quickly and accurately identify the right bin or location.

In another aspect of this disclosure, a gamification approach can be implemented in order to improve the human experience when moving items from a source bin to a destination bin. For example, the user interface 326 (or any user interface of any type, including visual, audible, haptic, textual, graphical, multimedia, and so forth) can include data that can inform, inspire, and/or motivate the human user. Generally speaking, the process of improving the human experience in elevating level of performance can be described as a gamification process.

For example, each successful "pick" of a group of items from a source bin to one or more destination bins can be identified or rewarded via a graphical icon such as a gold coin, a sound, such as a positive sounding bell, a haptic indicator, or any other type of indicator that provides information to the user of a successful transaction. As a human picker completes one successful transaction after another, further incentives and information could be provided. For example, the gamification interaction could include transaction indicators, which start in a certain mode and change over time as the user successfully achieves transaction after transaction. For example, the warehouse environment could be set up such that a user will have a set of picking assignments, which should take 3 hours. A gamification approach could provide the various types of feedback disclosed herein to encourage the user to achieve 100% success in the scheduled transactions of items from various source bins to various destination bins. For example, the user could get a gold coin or token presented in the user interface for each successful transaction and might receive some kind of bonus or reward for a fully successful session of picking. Machine learning algorithms could be utilized for each individual user or for a generalized user with respect to an achievable goal for that session.

For example, the machine learning algorithm can identify that once the source bins and destination bins are set, a human user should accomplish the transfer of items in 2 hours. Thus, as a user comes on a shift, the system could indicate that the goal for that session is to achieve all of the picking within two hours. If that goal is achieved, the user can receive a prize, bonus, work, break, or any other kind of incentive.

As the user begins a shift, the system can present data about their performance throughout the shift and whether they are on track to achieve the goal. If the user falls behind and needs to speed up, the system could provide that data, with perhaps an even higher prize if they are able to pick up the pace and achieve the desired goal.

As noted above, the goal might be generic to any human user or might take into account the specific user's capabilities. For example, if the specific user is very tall, that data parameter could be taken into account with respect to their goal for the session. A tall user might be able to move more items than a shorter user given the shelf/bin configurations set up. In one aspect, the system can receive feedback from the user regarding acceptance of the goal and thus the prize of the goal is achieved. The system could also provide alternate prizes for achieving 80% or 90% of the stated goal, or any threshold that has been met.

A method aspect in this regard can include a determination, based on a configuration of bins and items within a warehouse environment, of a goal which relates to a human picker moving items from a source bin to one or more destination bins within the warehouse environment. The goal can include a time element and/or a volume element of items to be moved from source bins to destination bins. For example, the goal might be to move 1000 items in a particular session or the goal might include depleting 10 source bins of the respective items within each bin to the proper destination bins within 45 minutes. The goal can take into account individual characteristics of the human picker. The system can present a user interface of any type to identify the goal, track performance, and provide prizes such as incentives for achieving the goal as well as alternate prizes for achieving a certain percentage of the goal. The system would receive feedback via the various devices disclosed herein with respect to the success of the picking operation of the human user, and incorporate that data into a gamification module, which can operate on any one or more of the systems disclosed herein, such that a human user in a picking session can be motivated to perform at a higher level than they otherwise might operate. Further, implementing such a gamification module can also improve the physical experience of the user when performing a picking operation during a session.

The gamification module could also take into account breaks. For example, if the human user takes a 10 minute break, the user can provide input regarding the brake such that it might not count against them when the performance is being tracked. Further, the system might automatically identify through location based mechanisms that the user is no longer in an aisle in the warehouse that has gone to the restroom. The system utilizing the gamification module can incorporate that bathroom break into the performance metrics.

The gamification module can include a number of different functionalities which can be used to encourage and motivate good performance. For example, if the user does make a mistake and places an item from of proper source bin into an improper destination bin, the system can provide a notification that an error has been made. The user can then transfer that item from the inappropriate destination bin to a proper destination bin and continue further picking. The system could identify to the user that an error has been made, but that if a certain performance moving forward is achieved, the error can be forgiven or erased. A user interface can be presented which identifies the existence of one error but can also present data regarding performance that could result in the elimination of that error such that the prize can be achieved. For example, one erroneously placed item could be erased as an error if the user achieves or finishes the session in 95% of the goal time or if the user moves 110% of the items identified as the goal for that session. One aspect of this disclosure is notifying the user of these goals, and of the information regarding the current performance, so as to motivate the user to improve their performance, obtain a prize, and have a more enjoyable picking experience.

The system will present the goal, track the performance, handle any errors by the human user, and where appropriate, provide the user with the reward. The reward can be anything of value, such as money, cryptocurrencies, time off from work, objects or items such as T-shirts, mugs, certificates, or anything of value that can be utilized to incentivize users as part of the gamification of the picking process. The gamification module it may also track the benefits over time, and provide one prize or benefit for performance over a longer period of time such as six months or a year. For example, users for filling a certain level of performance may receive airline tickets for travel or a cash bonus or any other thing of value. Of course other prizes were incentives can be provided for improved performance over past performance for each individual user. The system can track performance levels for each user, over days, weeks, months, and so forth. Thus, prizes can be provided for users to achieve 95% efficiency were previously they had achieved 90% efficiency. Graphical data can be presented to each individual worker regarding their daily, weekly or monthly performance levels. Of course any time period can apply as well.

The gamification module can also include other modules such as a prize determination module that determines, based on the performance metrics, what prize the user should receive, a user interface module, which can manage the presentation of data to the user, as disclosed herein, and receive user input as described herein. In one aspect, the user interface module could include an interface that enables a user to select a prize for high-performance metrics. This regard, the user is not presented with only a single prize option but could be with presented with a number of different prizes that can be available. In one aspect, the system could present options for various levels of performance. For example, if a certain configuration is typically processed in 3 hours, the system could offer a certain prize for performance at that level. However, given the variability of human performance, a particular user might desire a more valuable prize if they can achieve the session in 2 hours. The user interface module could present various options such as are described, such that the user can choose the goal and/or the prize.

In some embodiments the computer-readable storage devices, mediums, and memories used herein can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

I claim:

1. A system comprising:
   a control center;
   a shelf;
   a first robot in communication with the control center; and
   a second robot in communication with the control center, wherein the control center provides instructions to control the first robot and the second robot to perform operations comprising:
      identifying a location of a user who will transfer items from a first container, attached to the first robot, to a second container, attached to the second robot;
      positioning the first container via movement of the first robot at a first position near the location of the user, wherein the first position is on the shelf;
      positioning the second container via movement of the second robot at a second position near the location of the user, wherein the second position is on the shelf;
      providing instructions to the user regarding how many items to move from the first container to the second container;
      receiving a confirmation that at least one item has been received in the second container from the user; and
      moving the second container from the second position to a destination position.

2. The system of claim 1, wherein the shelf comprises a first semicircular shelf and a second semicircular shelf and wherein the first position is at a first elevation and on the first semicircular shelf than the second position which is at a second elevation and on the second semicircular shelf.

3. The system of claim 1, wherein the instructions to the user regarding how many items to move from the first container to the second container comprises one or more of audible instructions, visual instructions, haptic instructions, text instructions, virtual reality instructions, and multimodal instructions.

4. The system of claim 1, wherein the operations further comprise:
   positioning a third container via movement of a third robot at a third container position, the third container position near the location of the user;
   providing instructions to the user regarding how many items to move from the first container to the second container and the third container;
   receiving at least one item in the second container from the user and at least one item in the third container from the user;
   moving, via the second robot, the second container from the second position to a destination position for the at least one item in the second container; and
   moving, via the third robot, the third container from the third container position to a destination position for the at least one item in the third container.

5. The system of claim 1, wherein positioning the first container via movement of the first robot at the first position near the location of the user further comprises positioning the first container within arms reach of the user.

6. The system of claim 1, wherein positioning the second container via movement of the second robot at the second position near the location of the user further comprises positioning the second container within arms reach of the user.

7. The system of claim 1, wherein the operations further comprise:
   receiving a confirmation that the at least one item has been received in the second container; and
   based on the confirmation, moving the second container from the second position to the destination position for the at least one item.

8. A system comprising:
   a first robot in communication with a control center; and
   a second robot in communication with the control center, wherein the control center provides instructions to control the first robot and the second robot to perform operations comprising:
      positioning a first container configured on the first robot via movement of the first robot at a first position near a location of a user, wherein the first position is configured on a shelf;
      positioning a second container via movement of the second robot at a second position near the location of the user, wherein the second position is on the shelf; and
      moving the second container from the second position to a destination position after a confirmation that the second container received an item from the user.

9. The system of claim 8, wherein the positioning of the first container and the positioning of the second container occur via instructions from the control center.

10. The system of claim 9, wherein the moving of the second container from the second position to a destination position occurs via instructions from the control center.

11. The system of claim 8, wherein one or more of the first robot in the second robot comprises an item retrieval confirmation component or an item receipt confirmation component.

12. The system of claim 11, wherein the item retrieval confirmation component or the item receipt confirmation component comprises one or more of a motion detection component, a barge code scanning component, a weight scale component, a light based sensor component, an audio component, a video component, a multimodal input component, a touch sensitive screen, or a graphical interface.

13. The system of claim 8, further comprising:
a third robot in communication with the control center, wherein a third container on the third robot is positioned near the user and receives at least one item from the user.

14. The system of claim 8, wherein the shelf comprises a first semicircular shelf and a second semicircular shelf.

15. The system of claim 14, wherein the first position is at a first elevation and on the first semicircular shelf than the second position which is at a second elevation and on the second semicircular shelf.

16. A method of operating a first robot and a second robot in communication with a control center, the method comprising:
identifying a location of a user who will transfer items from a first container attached to the first robot to a second container attached to the second robot;
positioning, via the control center in wireless communication with the first robot, the first container via movement of the first robot at a first position near the location of the user, wherein the first position is on a shelf that enables the first robot to be in arms length of the user at the location;
positioning, via the control center in wireless communication with the second robot, the second container via movement of the second robot at a second position near the location of the user, wherein the second position is on the shelf that enables the second robot to be in arms length of the user at the location;
providing, via the control center and via virtual or augmented reality googles, instructions to the user regarding how many items to move from the first container to the second container;
receiving at least one item in the second container from the user; and
moving the second container from the second position to a destination position for the at least one item.

17. The method of claim 16, wherein the shelf comprises a first semicircular shelf and a second semicircular shelf and wherein the first position is at a first elevation and on the first semicircular shelf than the second position which is at a second elevation and on the second semicircular shelf.

18. The method of claim 16, wherein the instructions to the user regarding how many items to move from the first container to the second container comprises one or more of audible instructions, visual instructions, haptic instructions, text instructions, virtual reality instructions, and multimodal instructions.

19. The method of claim 16, further comprising:
positioning, via the control center in wireless communication with a third robot, a third container via movement of the third robot at a third container position, the third container position being within a threshold distance of the location of the user and wherein the third container position is on the shelf;
providing, via the control center, instructions to the user regarding how many items to move from the first container to the second container and the third container;
receiving at least one item in the second container from the user and at least one item in the third container from the user;
moving, via the second robot, the second container from the second position to a destination position for the at least one item in the second container; and
moving, via the third robot, the third container from the third container position to a destination position for the at least one item in the third container.

20. The method of claim 16, further comprising:
receiving a confirmation that the at least one item has been received in the second container; and
based on the confirmation, moving the second container from the second position to the destination position for the at least one item.

21. The method of claim 16, wherein the first robot and the second robot move on a smooth surface to the shelf that is independent of any object configured on the smooth surface that restrict or control movement of the first robot or the second robot.

* * * * *